United States Patent
Yang et al.

(10) Patent No.: US 12,192,986 B2
(45) Date of Patent: Jan. 7, 2025

(54) COMMUNICATING ABOUT SIDELINK RESOURCE AVAILABILITY WITHOUT LEGACY USER EQUIPMENT INTERFERENCE

(71) Applicant: QUALCOMM Incorporated, San Diego, CA (US)

(72) Inventors: Wei Yang, San Diego, CA (US); Seyedkianoush Hosseini, San Diego, CA (US); Tien Viet Nguyen, Bridgewater, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 603 days.

(21) Appl. No.: 17/444,528

(22) Filed: Aug. 5, 2021

(65) Prior Publication Data
US 2022/0046663 A1 Feb. 10, 2022

Related U.S. Application Data

(60) Provisional application No. 62/706,295, filed on Aug. 7, 2020.

(51) Int. Cl.
*H04W 72/1263* (2023.01)
*H04W 28/26* (2009.01)
(Continued)

(52) U.S. Cl.
CPC ....... *H04W 72/1263* (2013.01); *H04W 28/26* (2013.01); *H04W 72/20* (2023.01); *H04W 72/25* (2023.01); *H04W 72/569* (2023.01)

(58) Field of Classification Search
None
See application file for complete search history.

(56) References Cited

U.S. PATENT DOCUMENTS

2014/0119288 A1* 5/2014 Zhu ............... H04W 74/0816
                                                     370/329
2020/0275458 A1* 8/2020 Khoryaev ........... H04W 72/12
(Continued)

FOREIGN PATENT DOCUMENTS

WO   WO-2016181094 A1   11/2016
WO   WO-2020011336 A1    1/2020

OTHER PUBLICATIONS

International Search Report and Written Opinion—PCT/US2021/071134—ISA/EPO—Nov. 30, 2021.
(Continued)

*Primary Examiner* — Jutai Kao
(74) *Attorney, Agent, or Firm* — Harrity & Harrity, LLP

(57) ABSTRACT

Various aspects of the present disclosure generally relate to wireless communication. In some aspects, a first user equipment (UE) may identify a set of resources for exchanging, with a second UE, resource availability information associated with a sidelink channel. The set of resources are not allocated to a legacy UE. Accordingly, the first UE may exchange, with the second UE and using the set of resources, the resource availability information associated with the sidelink channel. Alternatively, the legacy UE may receive, from the second UE, a communication on a sidelink channel and determine that the communication is associated with resource availability information for the sidelink channel. Accordingly, the first UE may discard the communication based at least in part on the communication being associated with resource availability information for the sidelink channel. Numerous other aspects are provided.

30 Claims, 16 Drawing Sheets

(51) Int. Cl.
*H04W 72/20* (2023.01)
*H04W 72/25* (2023.01)
*H04W 72/566* (2023.01)

(56) References Cited

U.S. PATENT DOCUMENTS

2021/0204250 A1* 7/2021 Ashraf ................. H04W 72/02
2022/0159674 A1* 5/2022 Deng ................. H04W 72/566

OTHER PUBLICATIONS

LG Electronics, "Summary of Email Discussion on Rel-17 Sidelink Enhancement," 3GPP TSG RAN #86, 3GPP Draft, RP-192745, 3rd Generation Partnership Project (3GPP), Mobile Competence Centre, 650, Route Des Lucioles, F-06921 Sophia-Antipolis Cedex, France, vol. TSG RAN, No. Sitges, ES, Dec. 9, 2019-Dec. 12, 2019, Dec. 2, 2019 (Dec. 2, 2019), pp. 1-27, XP051834348, Retrieved from https://ftp.3gpp.org/tsg_ran/TSG_RAN/TSGR_86/Docs/RP-192745.zip.

* cited by examiner

COMMUNICATING ABOUT SIDELINK RESOURCE AVAILABILITY WITHOUT LEGACY USER EQUIPMENT INTERFERENCE

CROSS-REFERENCE TO RELATED APPLICATION

This Patent Application claims priority to U.S. Provisional Patent Application No. 62/706,295, filed on Aug. 7, 2020, entitled "COMMUNICATING ABOUT SIDELINK RESOURCE AVAILABILITY WITHOUT LEGACY USER EQUIPMENT INTERFERENCE," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for communication about sidelink resource availability without legacy user equipment interference.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include identifying a set of resources for exchanging, with a second UE, resource availability information associated with a sidelink channel, wherein the set of resources are not allocated to a legacy UE. The method may further include exchanging, with the second UE and using the set of resources, the resource availability information associated with the sidelink channel.

Some aspects described herein relate to a method of wireless communication performed by a first UE. The method may include transmitting, to a second UE, a request for resource availability information associated with a sidelink channel, wherein the request is associated with a higher priority than other data communicated on the sidelink channel. The method may further include receiving, from the second UE, the resource availability information associated with the sidelink channel, based at least in part on the request. The method may include transmitting, to a third UE, a communication on the sidelink channel, using one or more resources determined based at least in part on the resource availability information.

Some aspects described herein relate to a method of wireless communication performed by a first UE. The method may include receiving, from a second UE, a request for resource availability information associated with a sidelink channel. The method may further include transmitting, to the second UE, the resource availability information associated with the sidelink channel, based at least in part on the request, wherein the resource availability information is associated with a higher priority than other data communicated on the sidelink channel.

Some aspects described herein relate to a method of wireless communication performed by a first UE. The method may include receiving, from a second UE, a communication on a sidelink channel. The method may further include determining that the communication is associated with resource availability information for the sidelink channel. The method may include discarding the communication based at least in part on the communication being associated with resource availability information for the sidelink channel.

Some aspects described herein relate to a method of wireless communication performed by a first UE. The method may include encoding sidelink control information (SCI) associated with a communication for a second UE on a sidelink channel, wherein the communication is associated with resource availability information for the sidelink channel, and wherein the SCI indicates that the communication is not intended for a legacy UE. The method may further include transmitting, to the legacy UE, the SCI.

Some aspects described herein relate to an apparatus for wireless communication at a first UE. The apparatus may include a memory and one or more processors coupled with the memory. The one or more processors may be configured to identify a set of resources for exchanging, with a second UE, resource availability information associated with a sidelink channel, wherein the set of resources are not allocated to a legacy UE. The one or more processors may be further configured to exchange, with the second UE and using the set of resources, the resource availability information associated with the sidelink channel.

Some aspects described herein relate to an apparatus for wireless communication at a first UE. The apparatus may include a memory and one or more processors coupled with the memory. The one or more processors may be configured to transmit, to a second UE, a request for resource availability information associated with a sidelink channel, wherein the request is associated with a higher priority than other data communicated on the sidelink channel. The one or more processors may be further configured to receive, from the second UE, the resource availability information associated with the sidelink channel, based at least in part on the request. The one or more processors may be configured to transmit, to a third UE, a communication on the sidelink channel, using one or more resources determined based at least in part on the resource availability information.

Some aspects described herein relate to an apparatus for wireless communication at a first UE. The apparatus may include a memory and one or more processors coupled with the memory. The one or more processors may be configured to receive, from a second UE, a request for resource availability information associated with a sidelink channel. The one or more processors may be further configured to transmit, to the second UE, the resource availability information associated with the sidelink channel, based at least in part on the request, wherein the resource availability information is associated with a higher priority than other data communicated on the sidelink channel.

Some aspects described herein relate to an apparatus for wireless communication at a first UE. The apparatus may include a memory and one or more processors coupled with the memory. The one or more processors may be configured to receive, from a second UE, a communication on a sidelink channel. The one or more processors may be further configured to determine that the communication is associated with resource availability information for the sidelink channel. The one or more processors may be configured to discard the communication based at least in part on the communication being associated with resource availability information for the sidelink channel.

Some aspects described herein relate to an apparatus for wireless communication at a first UE. The apparatus may include a memory and one or more processors coupled with the memory. The one or more processors may be configured to encode SCI associated with a communication for a second UE on a sidelink channel, wherein the communication is associated with resource availability information for the sidelink channel, and wherein the SCI indicates that the communication is not intended for a legacy UE. The one or more processors may be further configured to transmit, to the legacy UE, the SCI.

Some aspects described herein relate to a non-transitory computer-readable medium that stores a set of instructions for wireless communication by a first UE. The set of instructions, when executed by one or more processors of the first UE, may cause the first UE to identify a set of resources for exchanging, with a second UE, resource availability information associated with a sidelink channel, wherein the set of resources are not allocated to a legacy UE. The set of instructions, when executed by one or more processors of the first UE, may further cause the first UE to exchange, with the second UE and using the set of resources, the resource availability information associated with the sidelink channel.

Some aspects described herein relate to a non-transitory computer-readable medium that stores a set of instructions for wireless communication by a first UE. The set of instructions, when executed by one or more processors of the first UE, may cause the first UE to transmit, to a second UE, a request for resource availability information associated with a sidelink channel, wherein the request is associated with a higher priority than other data communicated on the sidelink channel. The set of instructions, when executed by one or more processors of the first UE, may further cause the first UE to receive, from the second UE, the resource availability information associated with the sidelink channel, based at least in part on the request. The set of instructions, when executed by one or more processors of the first UE, may cause the first UE to transmit, to a third UE, a communication on the sidelink channel, using one or more resources determined based at least in part on the resource availability information.

Some aspects described herein relate to a non-transitory computer-readable medium that stores a set of instructions for wireless communication by a first UE. The set of instructions, when executed by one or more processors of the first UE, may cause the first UE to receive, from a second UE, a request for resource availability information associated with a sidelink channel. The set of instructions, when executed by one or more processors of the first UE, may further cause the first UE to transmit, to the second UE, the resource availability information associated with the sidelink channel, based at least in part on the request, wherein the resource availability information is associated with a higher priority than other data communicated on the sidelink channel.

Some aspects described herein relate to a non-transitory computer-readable medium that stores a set of instructions for wireless communication by a first UE. The set of instructions, when executed by one or more processors of the first UE, may cause the first UE to receive, from a second UE, a communication on a sidelink channel. The set of instructions, when executed by one or more processors of the first UE, may further cause the first UE to determine that the communication is associated with resource availability information for the sidelink channel. The set of instructions, when executed by one or more processors of the first UE, may cause the first UE to discard the communication based at least in part on the communication being associated with resource availability information for the sidelink channel.

Some aspects described herein relate to a non-transitory computer-readable medium that stores a set of instructions for wireless communication by a first UE. The set of instructions, when executed by one or more processors of the first UE, may cause the first UE to encode SCI associated with a communication for a second UE on a sidelink channel, wherein the communication is associated with resource availability information for the sidelink channel, and wherein the SCI indicates that the communication is not intended for a legacy UE. The set of instructions, when executed by one or more processors of the first UE, may further cause the first UE to transmit, to the legacy UE, the SCI.

Some aspects described herein relate to an apparatus for wireless communication. The apparatus may include means for identifying a set of resources for exchanging, with a UE, resource availability information associated with a sidelink channel, wherein the set of resources are not allocated to a legacy UE. The apparatus may further include means for exchanging, with the UE and using the set of resources, the resource availability information associated with the sidelink channel.

Some aspects described herein relate to an apparatus for wireless communication. The apparatus may include means for transmitting, to a first UE, a request for resource availability information associated with a sidelink channel, wherein the request is associated with a higher priority than other data communicated on the sidelink channel. The apparatus may further include means for receiving, from the first UE, the resource availability information associated with the sidelink channel, based at least in part on the request. The apparatus may include means for transmitting, to a second UE, a communication on the sidelink channel, using one or more resources determined based at least in part on the resource availability information.

Some aspects described herein relate to an apparatus for wireless communication. The apparatus may include means for receiving, from a UE, a request for resource availability information associated with a sidelink channel. The apparatus may further include means for transmitting, to the UE, the resource availability information associated with the sidelink channel, based at least in part on the request, wherein the resource availability information is associated with a higher priority than other data communicated on the sidelink channel.

Some aspects described herein relate to an apparatus for wireless communication. The apparatus may include means for receiving, from a UE, a communication on a sidelink channel. The apparatus may further include means for determining that the communication is associated with resource availability information for the sidelink channel. The apparatus may include means for discarding the communication based at least in part on the communication being associated with resource availability information for the sidelink channel.

Some aspects described herein relate to an apparatus for wireless communication. The apparatus may include means for encoding SCI associated with a communication to a UE on a sidelink channel, wherein the communication is associated with resource availability information for the sidelink channel, and wherein the SCI indicates that the communication is not intended for a legacy UE. The apparatus may further include means for transmitting, to the legacy UE, the SCI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
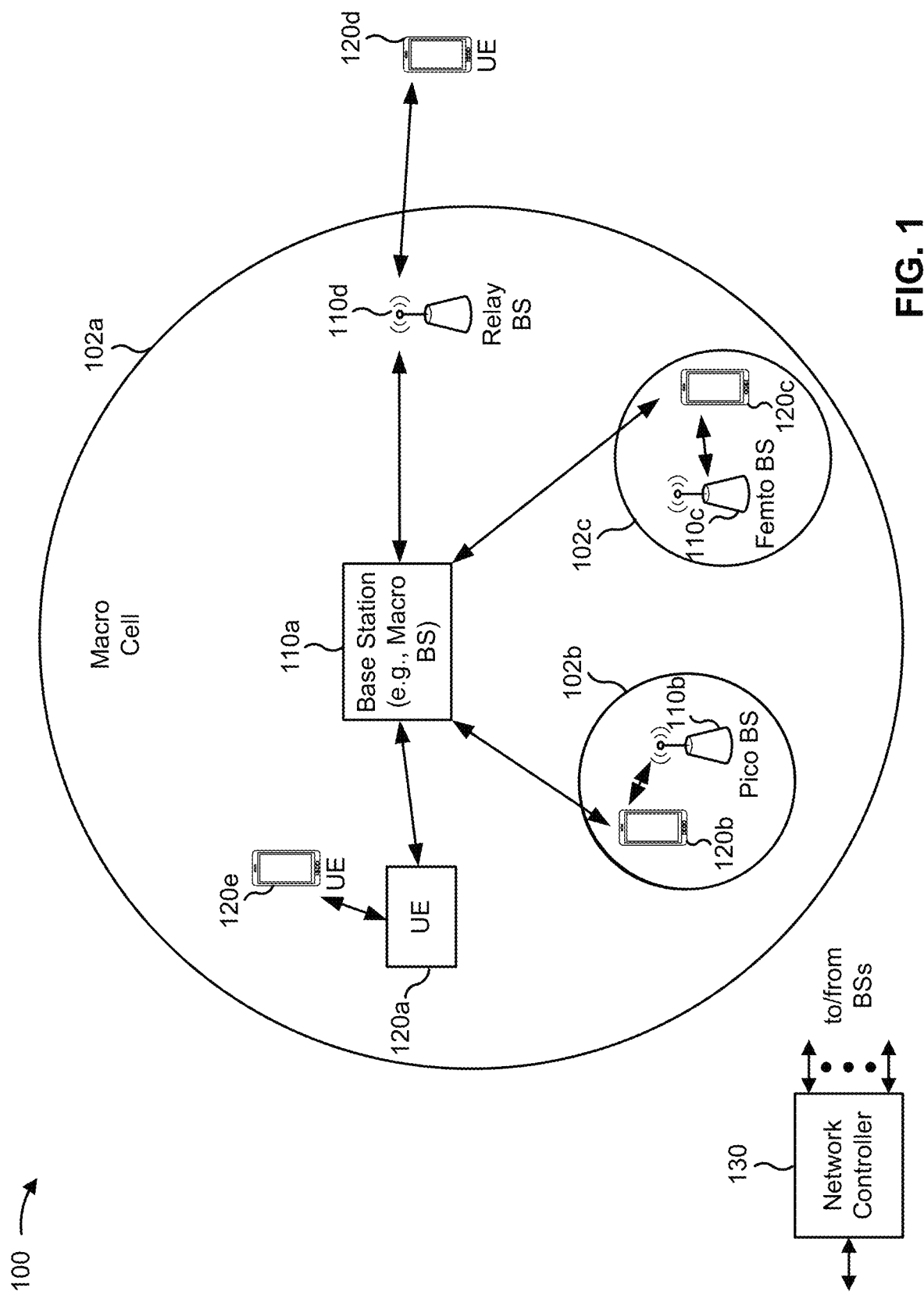
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
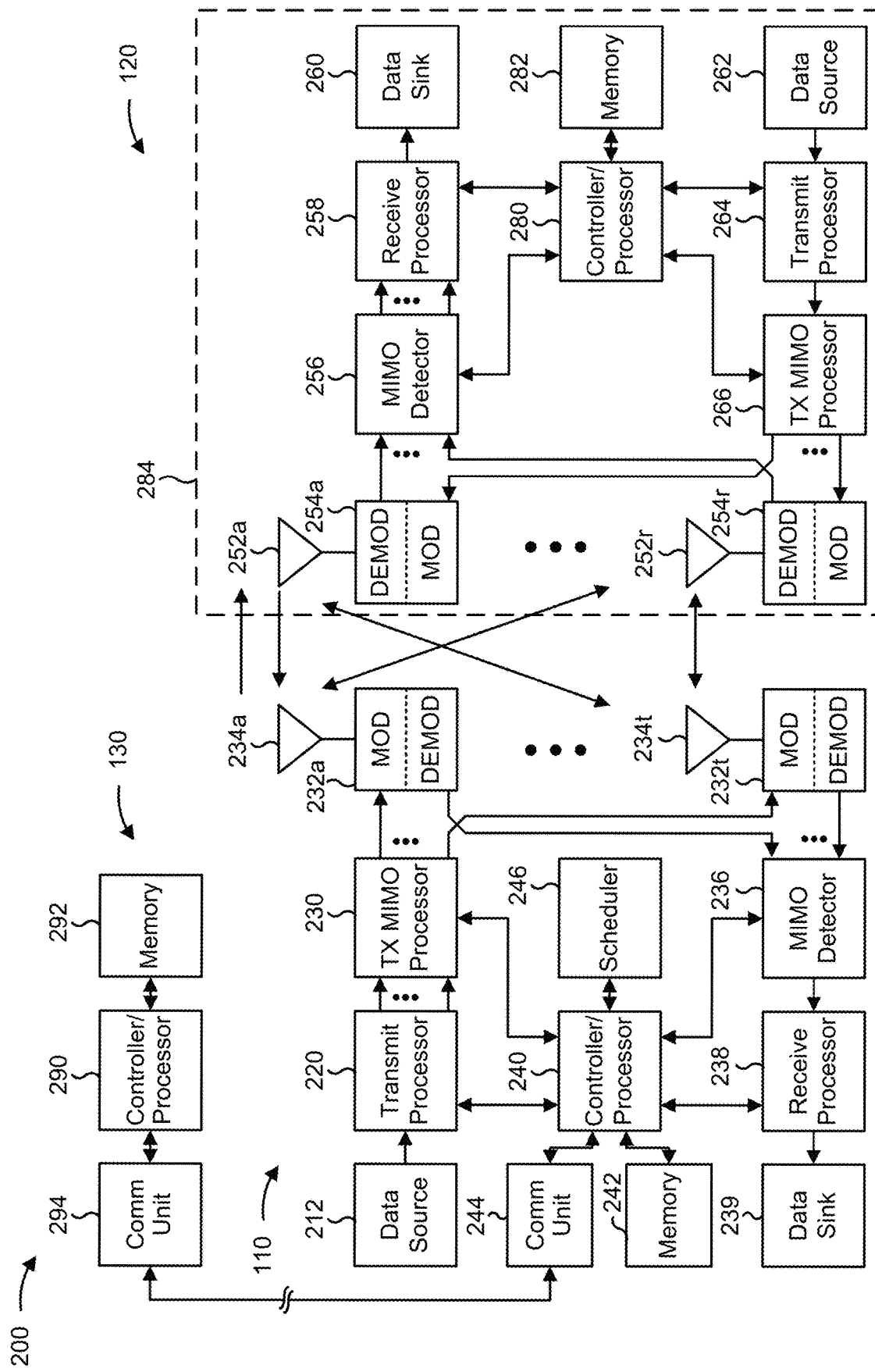
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-16).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-16).

The controller/processor 240 of the base station 110, the controller/processor 280 of the UE 120, and/or any other component(s) of FIG. 2 may perform one or more techniques associated with communication about sidelink resource availability without interference from legacy UEs, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, process 1200 of FIG. 12, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, a first UE (e.g., the UE 120 and/or apparatus 1500 of FIG. 15) may include means for identifying a set of resources for exchanging, with a second UE, resource availability information associated with a sidelink channel, wherein the set of resources are not allocated to a legacy UE; and/or means for exchanging, with the second UE and using the set of resources, the resource availability information associated with the sidelink channel. The means for the first UE to perform operations described herein may include, for example, one or more of antenna 252, modem 254, MIMO detector 256, receive processor 258, transmit processor 264, TX MIMO processor 266, controller/processor 280, or memory 282.

In some aspects, a first UE (e.g., the UE 120 and/or apparatus 1500 of FIG. 15) may include means for transmitting, to a second UE, a request for resource availability information associated with a sidelink channel, wherein the request is associated with a higher priority than other data communicated on the sidelink channel; means for receiving, from the second UE, the resource availability information associated with the sidelink channel, based at least in part on the request; and/or means for transmitting, to a third UE, a communication on the sidelink channel, using one or more resources determined based at least in part on the resource availability information. The means for the first UE to perform operations described herein may include, for example, one or more of antenna 252, modem 254, MIMO detector 256, receive processor 258, transmit processor 264, TX MIMO processor 266, controller/processor 280, or memory 282.

In some aspects, a first UE (e.g., the UE 120 and/or apparatus 1500 of FIG. 15) may include means for receiving, from a second UE, a request for resource availability information associated with a sidelink channel; and/or means for transmitting, to the second UE, the resource availability information associated with the sidelink channel, based at least in part on the request, wherein the resource availability information is associated with a higher priority than other data communicated on the sidelink channel. The means for the first UE to perform operations described herein may include, for example, one or more of antenna 252, modem 254, MIMO detector 256, receive processor 258, transmit processor 264, TX MIMO processor 266, controller/processor 280, or memory 282.

In some aspects, a first UE (e.g., the UE 120 and/or apparatus 1500 of FIG. 15) may include means for receiving, from a second UE, a communication on a sidelink channel; means for determining that the communication is associated with resource availability information for the sidelink channel; and/or means for discarding the communication based at least in part on the communication being associated with resource availability information for the sidelink channel. The means for the first UE to perform operations described herein may include, for example, one or more of antenna 252, modem 254, MIMO detector 256, receive processor 258, transmit processor 264, TX MIMO processor 266, controller/processor 280, or memory 282.

In some aspects, a first UE (e.g., the UE 120 and/or apparatus 1500 of FIG. 15) may include means for encoding sidelink control information (SCI) associated with a communication for a second UE on a sidelink channel, wherein the communication is associated with resource availability information for the sidelink channel, and wherein the SCI indicates that the communication is not intended for a legacy UE; and/or means for transmitting, to the legacy UE, the SCI. The means for the first UE to perform operations described herein may include, for example, one or more of antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
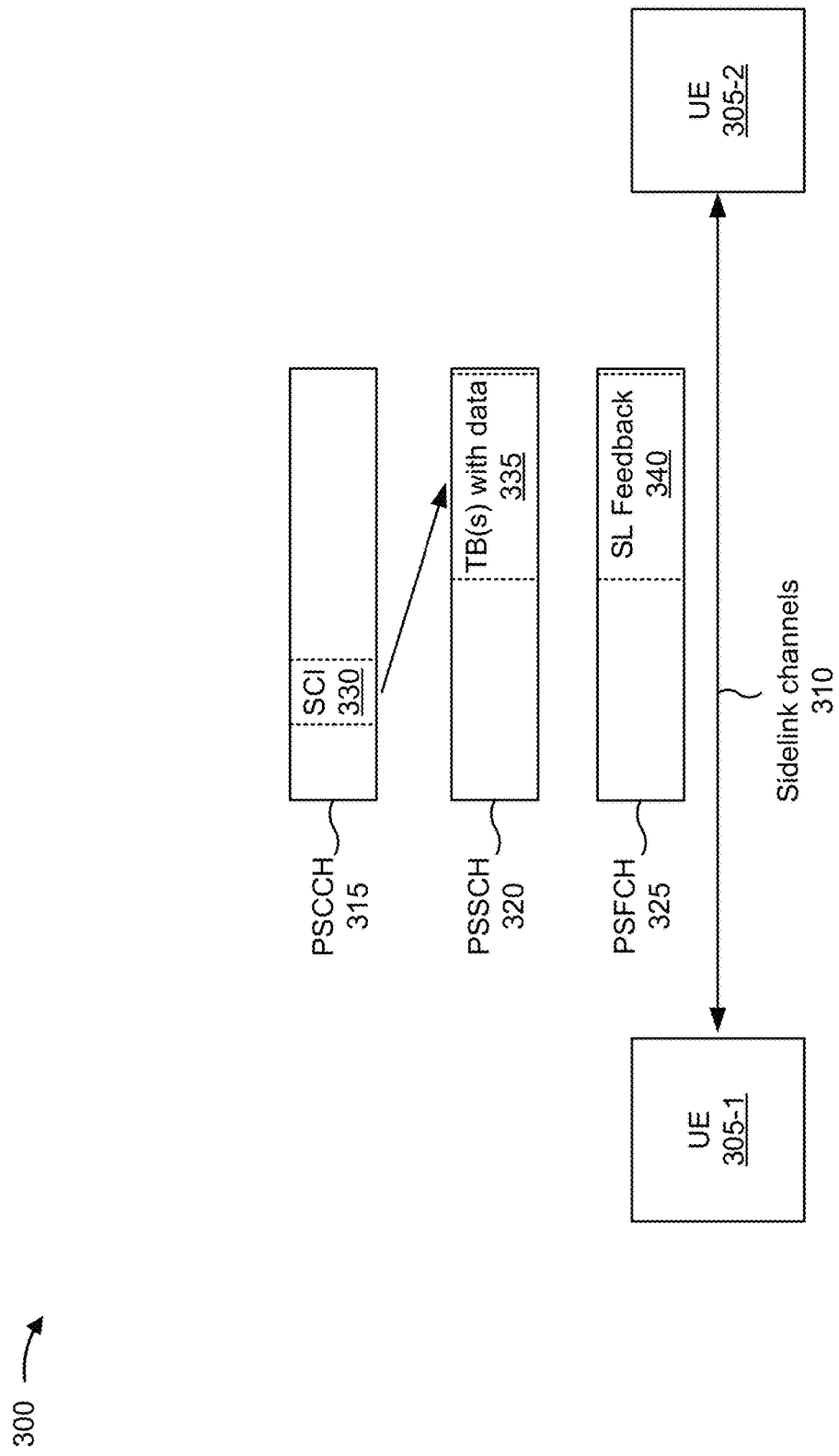
FIG. 3 is a diagram illustrating an example of sidelink communications, in accordance with the present disclosure.

FIG. 3 is a diagram illustrating an example 300 of sidelink communications, in accordance with the present disclosure. As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry SCI 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
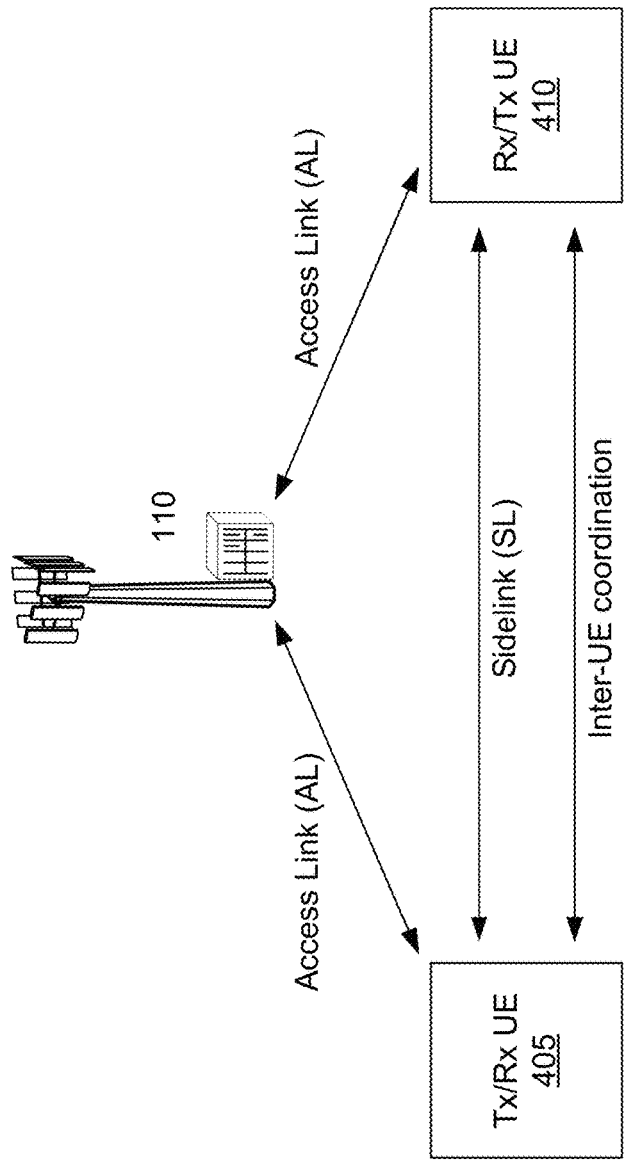
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure. As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
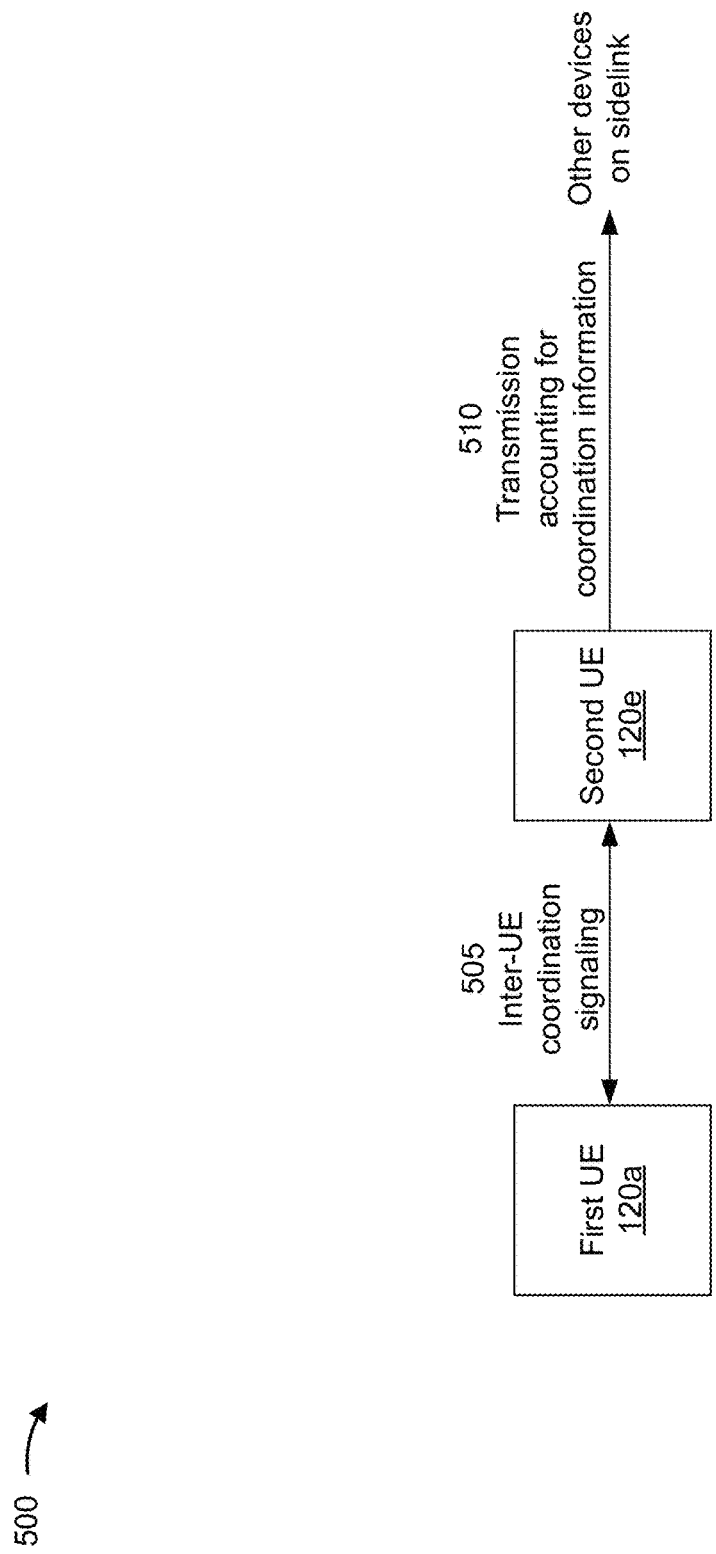
FIG. 5 is a diagram illustrating an example of coordination signaling, in accordance with the present disclosure.

FIG. 5 is a diagram illustrating an example 500 of coordination signaling, in accordance with the present disclosure. As shown by reference number 505, a first UE 120a exchanges inter-UE coordination signaling with a second UE 120e. The first UE and the second UE may operate in an in-coverage mode, a partial coverage mode, and/or an out-of-coverage mode. For example, the first UE 120a may determine a set of sidelink resources available for a resource allocation. The first UE 120a may determine the set of sidelink resources based at least in part on determining that the set of sidelink resources are to be selected, or based at least in part on a request (referred to herein as an inter-UE coordination request) received from the second UE 120e or a base station (e.g., base station 110). In some aspects, the first UE 120a may determine the set of sidelink resources based at least in part on a sensing operation, which may be performed before receiving an inter-UE coordination request or after receiving the inter-UE coordination request. The first UE 120a may transmit the set of available resources to the second UE 120e via inter-UE coordination signaling (also referred to as a coordination message or a coordination report). The first UE 120a may transmit the set of available resources using an NR sidelink resource allocation mode 2. In the NR sidelink resource allocation mode 2, resource allocation is handled by UEs (e.g., in comparison to an NR sidelink resource allocation mode 1, in which resource allocation is handled by a scheduling entity, such as the base station 110).

The second UE 120e may select a sidelink resource for a transmission from the second UE 120e based at least in part on the set of available resources received from the first UE 120a. As shown by reference number 510, the second UE may perform the transmission accounting for the coordination information (e.g., via a sidelink resource indicated by the coordination report). Inter-UE coordination signaling related to resource allocation may reduce collisions between the first UE and the second UE. Inter-UE coordination signaling related to resource allocation may reduce a power consumption for the first UE and/or the second UE.

As indicated above, FIG. 5 is provided as an example. Other examples may differ from what is described with respect to FIG. 5.

Figure 6:
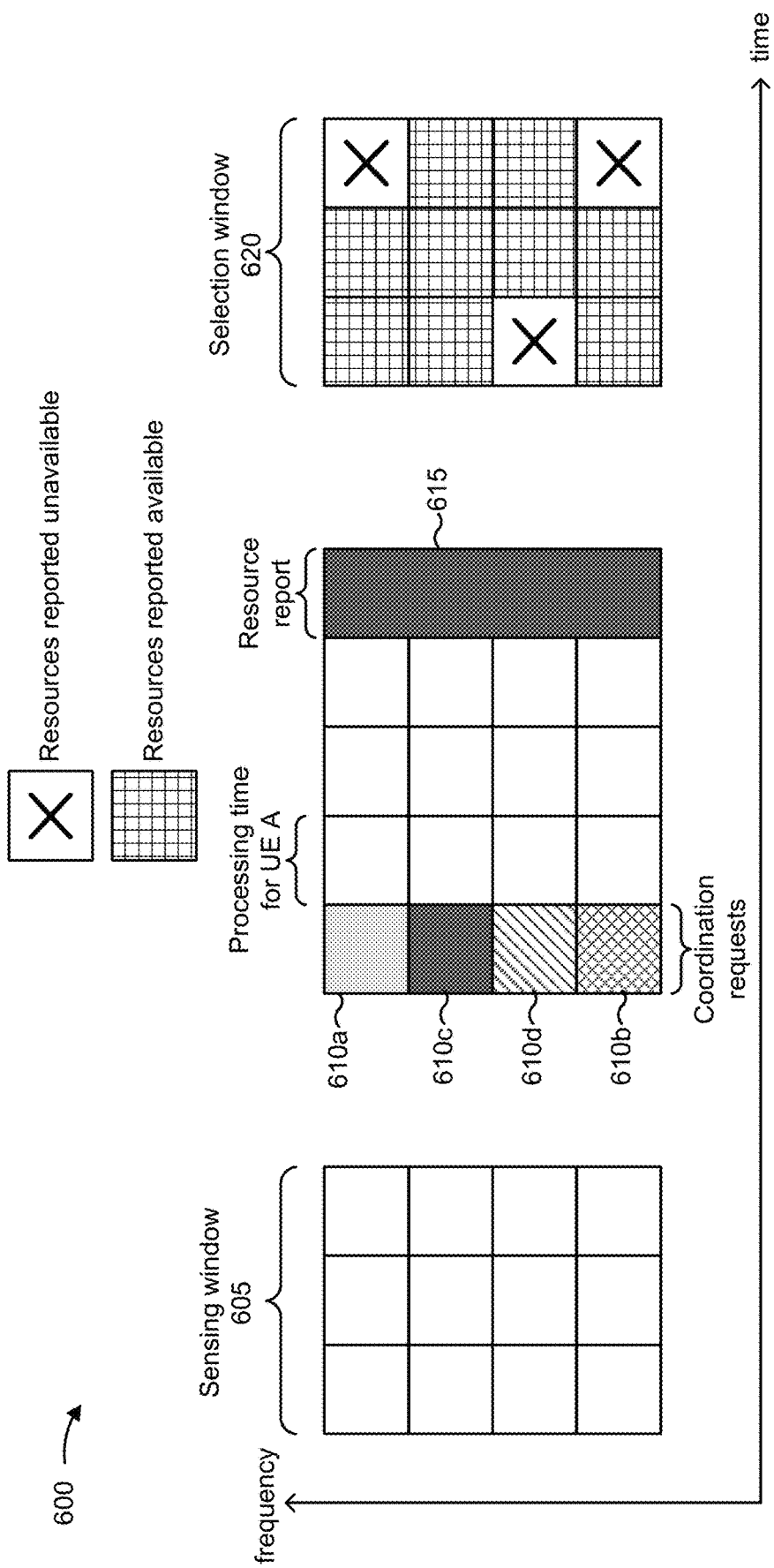
FIG. 6 is a diagram illustrating an example of resource sensing for sidelink inter-UE coordination, in accordance with the present disclosure.

FIG. 6 is a diagram illustrating an example 600 of resource sensing for sidelink inter-UE coordination, in accordance with the present disclosure. As shown in FIG. 6, during a sensing window 605, a UE A (which may correspond to, for example, UE 120*a*) may coordinate with other UEs, such as a UE B (which may correspond to, for example, UE 120*e*) and a UE C. For example, the UE B and/or the UE C may request assistance from the UE A in determining whether resources are available for communication. In another example, the UE A may receive a request from a base station (e.g., a base station 110) or a relay device (e.g., a relay BS) to assist with inter-UE coordination. In yet another example, the UE A may autonomously determine to transmit a coordination report, for example, based at least in part on observed network conditions.

The UE A may, during the sensing window 605, monitor for resource availability. The UE A may detect an inter-UE coordination request from, for example, the UE B (as shown by reference number 610*a*), the UE C (as shown by reference number 610*b*), and/or one or more other UEs (as shown by reference numbers 610*c* and 610*d*). As shown, the UE A may experience a processing delay between when UE A detects the request(s) for resources and when the UE A has processed the request and is triggered to transmit a coordination report to identify whether resources are available. In some aspects, the UE A may determine to transmit the coordination report (e.g., without receiving an inter-UE coordination request).

As shown by reference number 615, the UE A may transmit one or more reports regarding whether resources are available to the UE B, the UE C, and/or one or more other UEs. This reporting may be referred to as transmitting a coordination report or as inter-UE coordination reporting. The transmission of the reporting may occur before a selection window 620 (e.g., according to a processing time threshold) during which the UE A, the UE B, the UE C, and one or more other UEs may use resources that the UE A has identified as available. As shown, the UE A identifies one or more resources as available to the UE B and the UE C and other resources as unavailable.

As indicated above, FIG. 6 is provided as an example. Other examples may differ from what is described with respect to FIG. 6.

Inter-UE coordination enables a first UE to perform resource selection in order to facilitate sidelink communications by a second UE. For example, the second UE (or a base station) may transmit an inter-UE coordination request that causes the first UE to perform an inter-UE coordination operation. Accordingly, the first UE may identify a set of resources in a selection window based at least in part on receiving the inter-UE coordination request and based at least in part on a sensing operation and may transmit a coordination report to the second UE indicating the set of resources. The second UE may select at least one resource from the set of resources and may communicate on the selected resource(s).

Sometimes, collisions may occur between inter-UE coordination traffic (e.g., an inter-UE coordination request or a coordination report) and another communication. For example, the other communication may include a sidelink communication, or may include a communication on a Uu interface (e.g., an uplink communication or a downlink communication). In some situations, an inter-UE coordination communication may conflict with sidelink communications from a legacy UE. As used herein, "legacy UE" may refer to a UE that supports an earlier version of one or more standards (e.g., an earlier version of 3GPP specifications and/or another standard) relative to another UE and/or that uses older hardware and/or software relative to another UE. Thus, the reliability and/or quality of inter-UE coordination communications is reduced by collisions with sidelink communications from legacy UEs. Additionally, legacy UEs waste processing resources when attempting to decode inter-UE coordination communications that the legacy UEs are unable to interpret and to which the legacy UEs are not programmed, or otherwise configured, to respond.

Techniques and apparatuses described herein prevent collisions between inter-UE cooperation communications (e.g., a coordination request from a first UE 120*a* or a coordination report from a second UE 120*b*, among other examples) and sidelink communications from legacy UEs (e.g., UE 120*c*). Thus, the reliability and/or quality of inter-UE cooperation communications is improved by avoiding collisions between inter-UE cooperation communications and sidelink communications from the legacy UEs, thereby conserving computing and communication resources. Additionally, in some aspects, techniques and apparatuses described herein allow the legacy UEs to determine when sidelink communications are inter-UE cooperation communications and refrain from attempting to decode those inter-UE cooperation communications. Thus, the legacy UEs conserve processing resources by refraining from attempting to decode inter-UE coordination communications that the legacy UEs are unable to interpret and to which the legacy UEs are not programmed, or otherwise configured, to respond.

Figure 7:
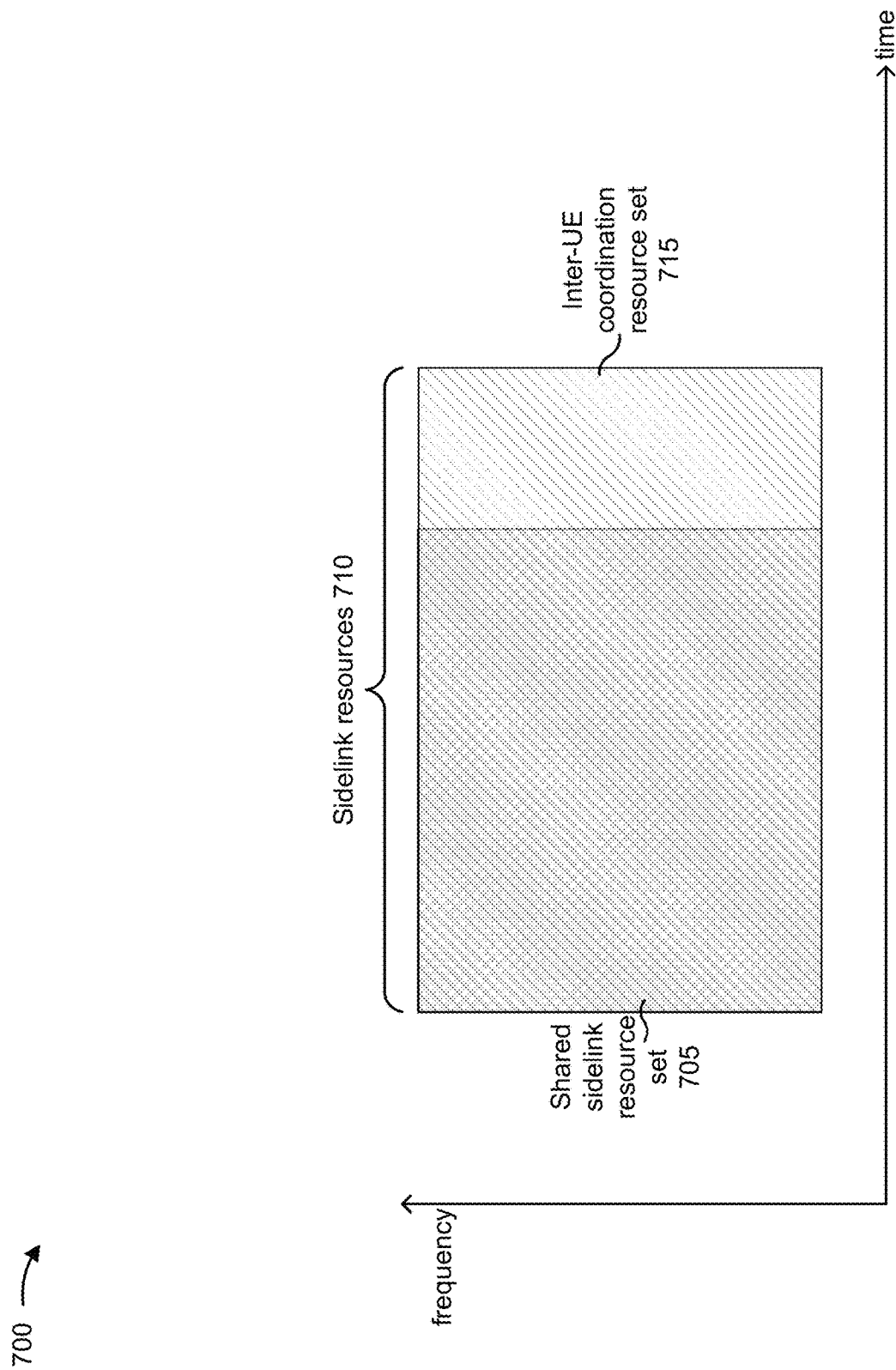
FIG. 7 is a diagram illustrating an example associated with resource allocation for communication about sidelink resource availability, in accordance with the present disclosure.

FIG. 7 is a diagram illustrating an example 700 associated with resource allocation for communication about sidelink resource availability, in accordance with the present disclosure. As shown in FIG. 7, example 700 includes a pool of sidelink resources 710. The resources may include frequency resources, such as one or more frequencies; time resources, such as one or more subframes, slots, and/or symbols; and/or spatial resources, such as one or more transmission configuration indicator (TCI) states (that may, for example, define one or more beams).

In some aspects, the pool 710 may be allocated to a plurality of UEs (e.g., a first UE 120*a*, a second UE 120*b*, a legacy UE 120*c*, and/or another UE) for use on one or more sidelink channels (e.g., as described in connection with FIGS. 3-4). Additionally, the pool 710 may include a set of resources 705 used for sidelink communications and a set of resources 715 used for inter-UE coordination. Accordingly, in some aspects, the set of resources 705 may be shared between the plurality of UEs, and the set of resources 715 may not be allocated to legacy UEs. In some aspects, a base station (e.g., base station 110) may perform the allocation (e.g., using radio resource control (RRC) signaling). Additionally, or alternatively, the allocation may be preconfigured (e.g., according to 3GPP specifications and/or another standard). Accordingly, the plurality of UEs may be programmed, and/or otherwise preconfigured, to use the set of resources 705, and non-legacy UEs of the plurality of UEs may be further programmed, and/or otherwise preconfigured, to use the set of resources 715.

In some aspects, the first UE 120*a* and the second UE 120*b* may identify the set of resources 715 for exchanging resource availability information associated with a sidelink channel (e.g., channel 310 as described in connection with FIG. 3), where the set of resources 715 are not allocated to the legacy UE 120*c*. Accordingly, the first UE 120*a* and the second UE 120*b* may exchange, using the set of resources 715, the resource availability information associated with the sidelink channel.

In some aspects, the first UE 120*a* may request inter-UE coordination, and the second UE 120*b* may report based at least in part on the request. Accordingly, the first UE 120*a* may transmit, and the second UE 120*b* may receive, using the set of resources 715, a request for the resource availability information associated with the sidelink channel. In some aspects, the first UE 120a may schedule the request using SCI. For example, the first UE 120a may use SCI-1 to reserve at least a portion of the set of resources 715 and schedule the request within the reserved portion. In some aspects, the request may include an inter-UE coordination request (e.g., as described in connection with FIG. 5).

The second UE 120b may further transmit, and the first UE 120a may receive, using the set of resources 715, the resource availability information associated with the sidelink channel. In some aspects, the second UE 120b may transmit the resource availability information based at least in part on the request from the first UE 120a. The second UE 120b may perform a sensing operation (e.g., as described in connection with FIG. 6) in order to generate a report including the resource availability information. Accordingly, the second UE 120b may transmit, and the first UE 120a may receive, the resource availability information in an inter-UE coordination report.

The first UE 120a may further transmit, to another UE (e.g., a third UE 120d and/or another UE), a communication on the sidelink channel (e.g., as described in connection with FIG. 3), using one or more resources determined based at least in part on the resource availability information. For example, the first UE 120a may determine the one or more resources as described in connection with FIGS. 5-6. In some aspects, the first UE 120a may select the one or more resources from the set of resources 705 that that are shared with the legacy UE 120c. In some aspects, the first UE 120a may schedule the communication using SCI. For example, the first UE 120a may use SCI-2 to reserve at least a portion of the set of resources 705 and schedule the sidelink communication within the reserved portion.

By using techniques as described in connection with FIG. 7, the first UE 120a avoids collisions between inter-UE coordination reports and sidelink communications from the legacy UE 120c. Additionally, the second UE 120b avoids collisions between inter-UE coordination requests and sidelink communications from the legacy UE 120c. Accordingly, the first UE 120a and the second UE 120b experience improved reliability and/or quality of inter-UE cooperation communications. Additionally, the legacy UE 120c avoids receiving inter-UE coordination requests and/or reports. Accordingly, the legacy UE 120c conserves processing resources by not attempting to decode inter-UE coordination communications that the legacy UE 120c is unable to interpret and to which the legacy UE 120c is not programmed, or otherwise configured, to respond.

As indicated above, FIG. 7 is provided as an example. Other examples may differ from what is described with respect to FIG. 7.

Figure 8:
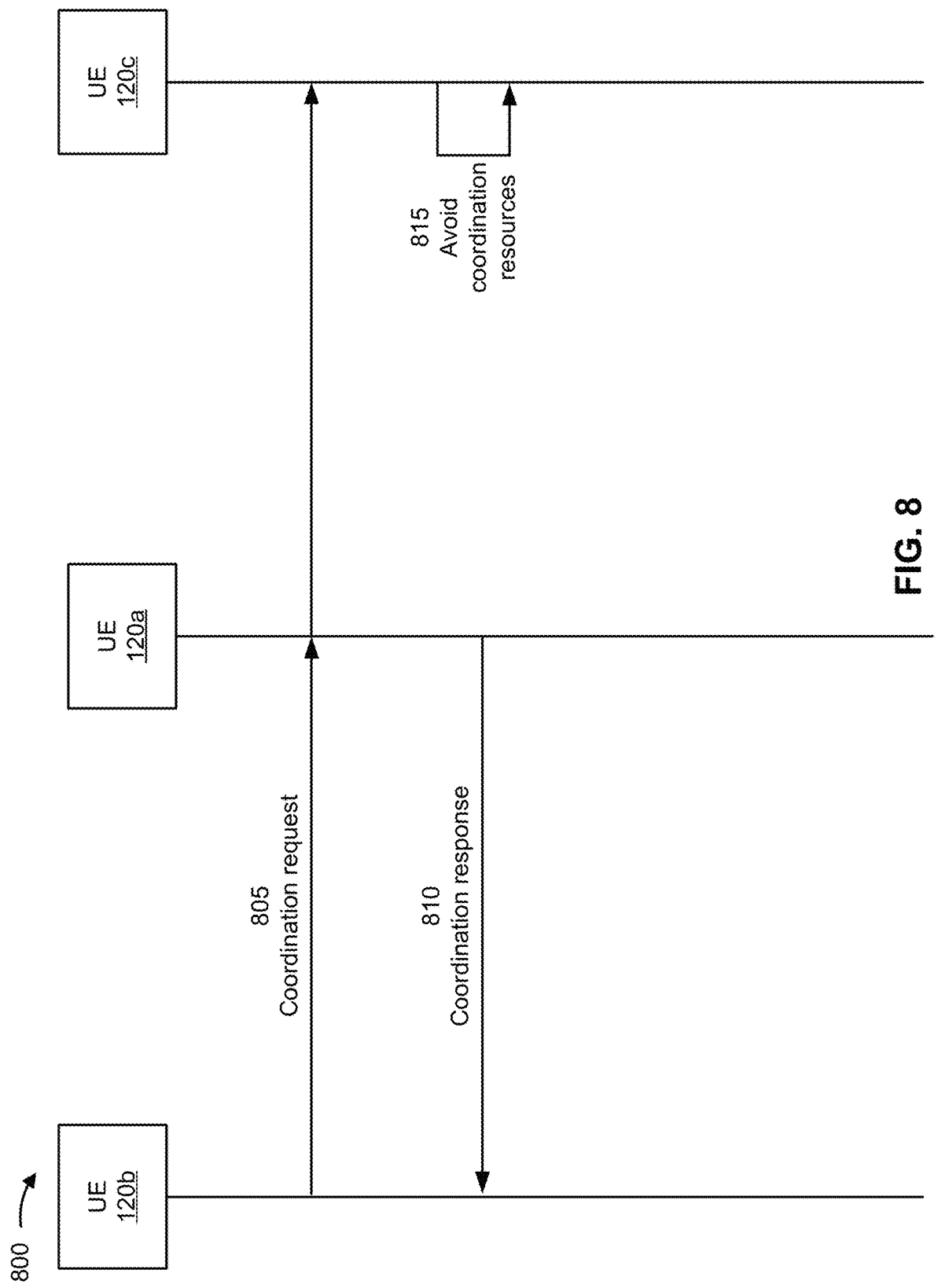
FIG. 8 is a diagram illustrating an example associated with legacy UEs avoiding priority communications about sidelink resource availability, in accordance with the present disclosure.

FIG. 8 is a diagram illustrating an example 800 associated with legacy UEs avoiding priority communications about sidelink resource availability, in accordance with the present disclosure. As shown in FIG. 8, example 800 includes sidelink communications between a UE 120a, a UE 120b, and a UE 120c. In some aspects, the UE 120a, the UE 120b, and the UE 120c may be included in a wireless network, such as wireless network 100. The UE 120a, the UE 120b, and the UE 120c may communicate on a sidelink channel (e.g., channel 310 as described in connection with FIG. 3). In some aspects, the UE 120c may be a legacy UE relative to the first UE 120a and the second UE 120b.

As shown in connection with reference number 805, the second UE 120b may transmit, and the first UE 120a may receive, a request for resource availability information associated with a sidelink channel. In some aspects, the request may be associated with a higher priority than other data communicated on the sidelink channel. For example, the second UE 120b may encode the request with an indicator of a highest priority.

In some aspects, the second UE 120b may schedule the request using SCI. For example, the second UE 120b may use SCI-1 to reserve resources and schedule the request within the reserved resources. In some aspects, the SCI may include the indicator of the priority, as described above.

Accordingly, the second UE 120b may reserve resources that the second UE 120b uses to transmit, and the first UE 120a uses to receive, the request. Additionally, or alternatively, a base station (e.g., base station 110) and/or another UE (e.g., a third UE 120d) may have reserved the resources that the second UE 120b uses to transmit, and the first UE 120a uses to receive, the request. For example, the base station 110 may have allocated a set of resources from which the second UE 120b selects the resources that the second UE 120b uses to transmit, and the first UE 120a uses to receive, the request. Similarly, the third UE 120d may have reserved (e.g., using SCI-1) a set of resources from which the second UE 120b selects the resources that the second UE 120b uses to transmit, and the first UE 120a uses to receive, the request. As another example, the base station 110 may have allocated a set of resources from which the third UE 120d reserves (e.g., using SCI-1) a subset of resources. Accordingly, the second UE 120b may select, from the subset of resources, the resources that the second UE 120b uses to transmit, and the first UE 120a uses to receive, the request.

In any of the aspects described above, the second UE 120b may contend (e.g., with the third UE 120d) for the resources that the second UE 120b uses to transmit, and the first UE 120a uses to receive, the request. For example, a medium access control (MAC) layer of the second UE 120b may contend with MAC layers of other UEs on the sidelink channel for those resources.

As shown in connection with reference number 810, the first UE 120a may transmit, and the second UE 120b may receive, the resource availability information associated with the sidelink channel, based at least in part on the request. Additionally with, or alternatively to, the request, the resource availability information may be associated with a higher priority than other data communicated on the sidelink channel. For example, the first UE 120a may encode the resource availability information with an indicator of a highest priority.

In some aspects, the first UE 120a may schedule the resource availability information using SCI. Accordingly, the SCI may include the indicator of the priority, as described above.

In some aspects, the first UE 120a may reserve resources that the first UE 120a uses to transmit, and the second UE 120b uses to receive, the resource availability information. Additionally, or alternatively, a base station (e.g., base station 110) and/or another UE (e.g., a third UE 120d) may have reserved the resources that the first UE 120a uses to transmit, and the second UE 120b uses to receive, the resource availability information. For example, the base station 110 may have allocated a set of resources from which the first UE 120a selects the resources that the first UE 120a uses to transmit, and the second UE 120b uses to receive, the resource availability information. Similarly, the third UE 120d may have reserved a set of resources from which the first UE 120a selects the resources that the first UE 120a uses to transmit, and the second UE 120b uses to receive, the resource availability information. As another example, the base station 110 may have allocated a set of resources from which the third UE 120*d* reserves a subset of resources. Accordingly, the first UE 120*a* may select, from the subset of resources, the resources that the first UE 120*a* uses to transmit, and the second UE 120*b* uses to receive, the resource availability information.

In any of the aspects described above, the first UE 120*a* may contend (e.g., with the third UE 120*d*) for the resources that the first UE 120*a* uses to transmit, and the second UE 120*b* uses to receive, the resource availability information. For example, a MAC layer of the first UE 120*a* may contend with MAC layers of other UEs on the sidelink channel for those resources.

As shown in connection with reference number 815, the legacy UE 120*c* may refrain from transmitting on the resources used for the request (as described in connection with reference number 805) and the resources used for the report (as described in connection with reference number 810). In some aspects, the legacy UE 120*c* may determine, based at least in part on the priority as described above, not to transmit on the resources used for the request and/or the resources used for the report. For example, the legacy UE 120*c* may receive SCI from the first UE 120*a* and/or SCI from the second UE 120*b* and determine that the SCI indicates a higher priority level for the response and/or the request, respectively, than a priority level used, by the legacy UE 120*c*, for sidelink communication and/or communication on a Uu interface. Accordingly, based at least in part on this determination, the legacy UE 120*c* may determine that resources indicated (e.g., in the SCI) for the response and/or the request, respectively, are not available to the legacy UE 120*c* for communication.

In some aspects, the second UE 120*b* may further transmit, and a fourth UE (e.g., UE 120*e*) may receive, a communication on the sidelink channel, using one or more resources determined based at least in part on the resource availability information. For example, the second UE 120*b* may determine the one or more resources as described in connection with FIGS. 5-6. In some aspects, the second UE 120*b* may select the one or more resources from a set of resources that are shared with the legacy UE 120*c*.

In some aspects, the second UE 120*b* may schedule the communication using SCI. For example, the second UE 120*b* may use SCI-2 to reserve the one or more resources and schedule the communication within the one or more resources.

By using techniques as described in connection with FIG. 8, the first UE 120*a* avoids collisions between inter-UE coordination reports and sidelink communications from the legacy UE 120*c*. Additionally, the second UE 120*b* avoids collisions between inter-UE coordination requests and sidelink communications from the legacy UE 120*c*. Accordingly, the first UE 120*a* and the second UE 120*b* experience improved reliability and/or quality of inter-UE cooperation communications.

Example 800 may be combined with example 700. For example, the second UE 120*b* may transmit the request (e.g., as described in connection with reference number 805) on a set of resources not allocated to the legacy UE 120*c* (e.g., resources 715 as shown in FIG. 7). Accordingly, the second UE 120*b* may use an associated priority in addition to, or in lieu of, dedicated resources to avoid interference with the legacy UE 120*c*. Additionally, or alternatively, the first UE 120*a* may transmit the response (e.g., as described in connection with reference number 810) on a set of resources not allocated to the legacy UE 120*c* (e.g., resources 715 as shown in FIG. 7). Accordingly, the first UE 120*a* may use an associated priority in addition to, or in lieu of, dedicated resources to avoid interference with the legacy UE 120*c*. In one example, the second UE 120*b* may transmit the request on a set of resources not allocated to the legacy UE 120*c* (e.g., resources 715 as shown in FIG. 7) to avoid interference, and the first UE 120*a* may use a priority associated with the response to avoid interference. In another example, the second UE 120*b* may use a priority associated with the request to avoid interference, and the first UE 120*a* may transmit the response on a set of resources not allocated to the legacy UE 120*c* (e.g., resources 715 as shown in FIG. 7) to avoid interference.

As indicated above, FIG. 8 is provided as an example. Other examples may differ from what is described with respect to FIG. 8.

Figure 9:
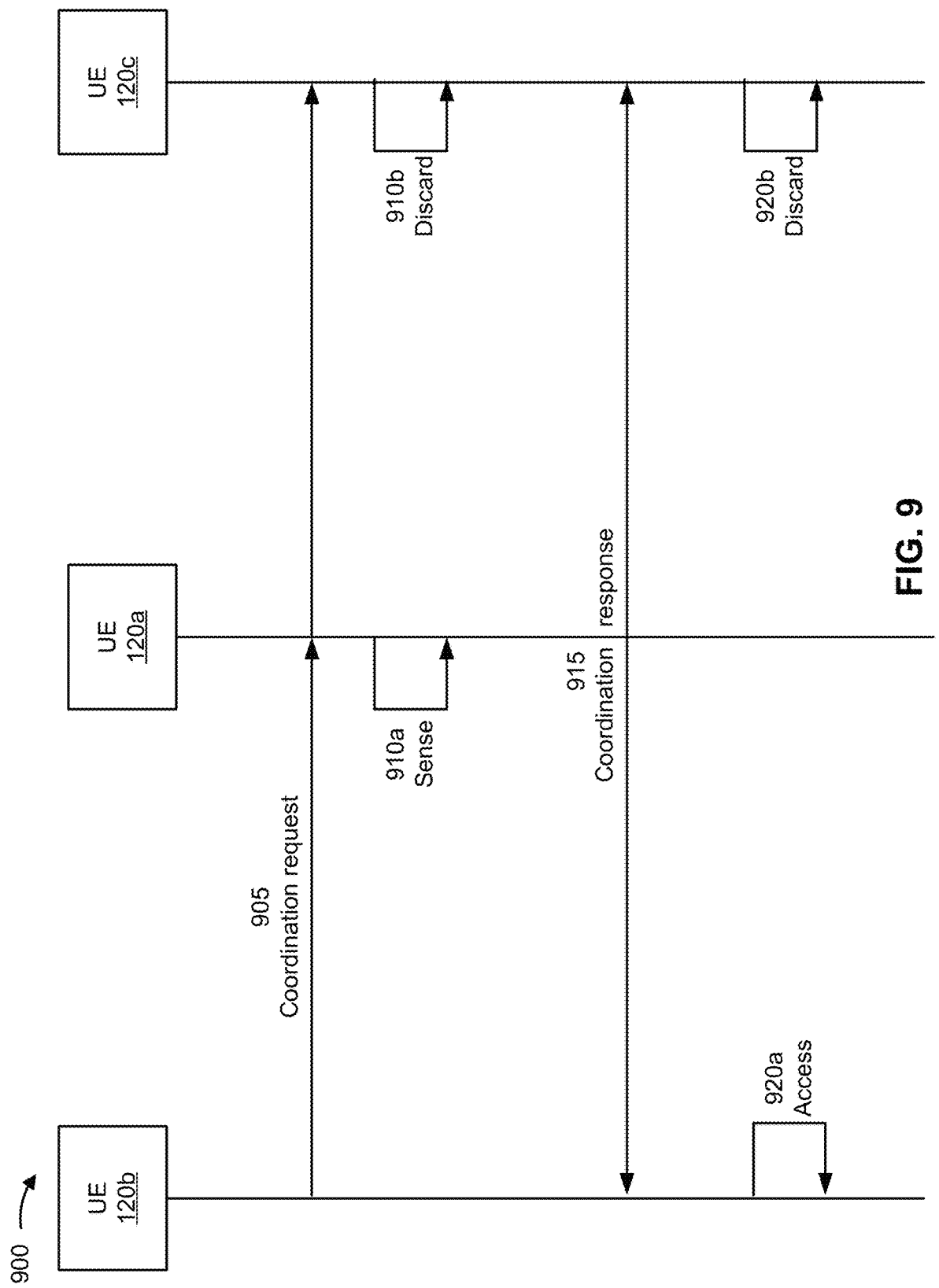
FIG. 9 is a diagram illustrating an example associated with legacy UEs discarding communications about sidelink resource availability, in accordance with the present disclosure.

FIG. 9 is a diagram illustrating an example 900 associated with legacy UEs discarding communications about sidelink resource availability, in accordance with the present disclosure. As shown in FIG. 9, example 900 includes sidelink communication between a UE 120*a*, a UE 120*b*, and a UE 120*c*. In some aspects, the UE 120*a*, the UE 120*b*, and the UE 120*c* may be included in a wireless network, such as wireless network 100. The UE 120*a*, the UE 120*b*, and the UE 120*c* may communicate on a sidelink channel (e.g., channel 310 as described in connection with FIG. 3). In some aspects, the UE 120*c* may be a legacy UE relative to the first UE 120*a* and the second UE 120*b*.

As shown in connection with reference number 905, the second UE 120*b* may transmit, and the first UE 120*a* may receive, an inter-UE coordination request. For example, the second UE 120*b* may transmit, and the first UE 120*a* may receive, the request as described in connection with reference number 805 of FIG. 8. In some aspects, the second UE 120*b* may encode SCI (e.g., SCI-1 and/or SCI-2), associated with the request, indicating that the request is not intended for the legacy UE 120*c*.

As shown in connection with reference number 910*a*, and based at least in part on the request, the first UE 120*a* may perform a sensing operation (e.g., as described in connection with FIG. 6). Accordingly, the first UE 120*a* may generate a report including resource availability information for the sidelink channel.

As shown in connection with reference number 910*b*, the legacy UE 120*c* may determine that the request is associated with resource availability information for the sidelink channel and discard the request based at least in part on the determining that the request is associated with resource availability information for the sidelink channel. In some aspects, the legacy UE 120*c* may determine that the request is associated with resource availability information for the sidelink channel based at least in part on a priority associated with the request (e.g., as described in connection with FIG. 8). For example, the priority may be indicated in SCI from the second UE 120*b*.

Additionally, or alternatively, the legacy UE 120*c* may determine that the request is associated with resource availability information for the sidelink channel based at least in part on a destination identifier associated with the request. For example, the priority may be indicated in SCI from the second UE 120*b*. In some aspects, the destination identifier may include a group identifier (e.g., a group radio network temporary identifier (G-RNTI)) associated with a group of UEs that does not include the legacy UE 120*c*. Additionally, or alternatively, the destination identifier may include one or more UE-specific identifiers (e.g., one or more radio network temporary identifiers (RNTIs)) that are not associated with the legacy UE 120*c*.

Additionally, or alternatively, the legacy UE 120c may determine that the request is associated with resource availability information for the sidelink channel based at least in part on a message type field associated with the request. For example, the message type field may be included in SCI from the second UE 120b. In some aspects, the message type field may include a bit or other information indicating that the request is not intended for legacy UEs.

Additionally, or alternatively, the legacy UE 120c may determine that the request is associated with resource availability information for the sidelink channel based at least in part on a format of SCI scheduling the request. For example, the SCI (e.g., SCI-2) from the second UE 120b may be in a format that the legacy UE 120c does not recognize. Accordingly, the legacy UE 120c may implicitly determine that the request is associated with resource availability information for the sidelink channel.

In any of the aspects described above, and as described in connection with FIG. 8, the legacy UE 120c may further identify a set of resources associated with the request on the sidelink channel and refrain from using the set of resources on the sidelink channel. For example, the legacy UE 120c may identify the set of resources using SCI from the second UE 120b that reserves the set of resources.

As shown in connection with reference number 915, the first UE 120a may transmit, and the second UE 120b may receive, a response to the request. For example, the first UE 120a may transmit, and the second UE 120b may receive, the response as described in connection with reference number 810 of FIG. 8. In some aspects, the first UE 120a may encode SCI (e.g., SCI-1 and/or SCI-2), associated with the request, indicating that the response is not intended for the legacy UE 120c.

As shown in connection with reference number 920a, and based at least in part on the response, the second UE 120b may access one or more resources determined based at least in part on the response. For example, the second UE 120b may further transmit, and a third UE (e.g., UE 120d) may receive, a communication on the sidelink channel, using the one or more resources determined based at least in part on the response. The second UE 120b may determine the one or more resources as described in connection with FIGS. 5-6.

As shown in connection with reference number 920b, the legacy UE 120c may determine that the response is associated with resource availability information for the sidelink channel and discard the response based at least in part on the determining. In some aspects, the legacy UE 120c may determine that the response is associated with resource availability information for the sidelink channel based at least in part on a priority associated with the response (e.g., as described in connection with FIG. 8). For example, the priority may be indicated in SCI from the first UE 120a.

Additionally, or alternatively, the legacy UE 120c may determine that the response is associated with resource availability information for the sidelink channel based at least in part on a destination identifier associated with the response. For example, the priority may be indicated in SCI from the first UE 120a. In some aspects, the destination identifier may include a group identifier (e.g., a G-RNTI) associated with a group of UEs that does not include the legacy UE 120c. Additionally, or alternatively, the destination identifier may include one or more UE-specific identifiers (e.g., one or more RNTIs) that is not associated with the legacy UE 120c.

Additionally, or alternatively, the legacy UE 120c may determine that the response is associated with resource availability information for the sidelink channel based at least in part on a message type field associated with the response. For example, the message type field may be included in SCI from the first UE 120a. In some aspects, the message type field may include a bit or other information indicating that the response is not intended for legacy UEs.

Additionally, or alternatively, the legacy UE 120c may determine that the response is associated with resource availability information for the sidelink channel based at least in part on a format of SCI scheduling the response. For example, the SCI (e.g., SCI-2) from the first UE 120a may be in a format that the legacy UE 120c does not recognize. Accordingly, the legacy UE 120c may implicitly determine that the response is associated with resource availability information for the sidelink channel.

In any of the aspects described above, and as described in connection with FIG. 8, the legacy UE 120c may further identify a set of resources associated with the response on the sidelink channel and refrain from using the set of resources on the sidelink channel. For example, the legacy UE 120c may identify the set of resources using SCI from the first UE 120a that reserves the set of resources.

By using techniques as described in connection with FIG. 9, the first UE 120a and the second UE 120b avoid collisions between inter-UE coordination communications and other sidelink communications from the legacy UE 120c. Accordingly, the first UE 120a and the second UE 120b experience improved reliability and/or quality of inter-UE cooperation communications. In some aspects, the legacy UE 120c avoids attempting to decode inter-UE coordination requests and/or reports. Accordingly, the legacy UE 120c conserves processing resources by not attempting to decode communications that the legacy UE 120c is unable to interpret and to which the legacy UE 120c is not programmed, or otherwise configured, to respond.

Example 900 may be combined with example 700 and/or example 800. For example, the second UE 120b may transmit the request (e.g., as described in connection with reference number 905) on a set of resources not allocated to the legacy UE 120c (e.g., resources 715 as shown in FIG. 7). Accordingly, the second UE 120b may encode SCI indicating that the request is not intended for legacy UEs in addition to, or in lieu of, transmitting on dedicated resources to avoid interference with the legacy UE 120c. Additionally, or alternatively, the first UE 120a may transmit the response (e.g., as described in connection with reference number 915) on a set of resources not allocated to the legacy UE 120c (e.g., resources 715 as shown in FIG. 7). Accordingly, the first UE 120a may encode SCI indicating that the response is not intended for legacy UEs in addition to, or in lieu of, transmitting on dedicated resources to avoid interference with the legacy UE 120c. In one example, the second UE 120b may transmit the request on a set of resources not allocated to the legacy UE 120c (e.g., resources 715 as shown in FIG. 7) to avoid interference, and the first UE 120a may encode SCI indicating that the response is not intended for legacy UEs. In another example, the second UE 120b may encode SCI indicating that the request is not intended for legacy UEs, and the first UE 120a may transmit the response on a set of resources not allocated to the legacy UE 120c (e.g., resources 715 as shown in FIG. 7) to avoid interference.

As indicated above, FIG. 9 is provided as an example. Other examples may differ from what is described with respect to FIG. 9.

Figure 10:
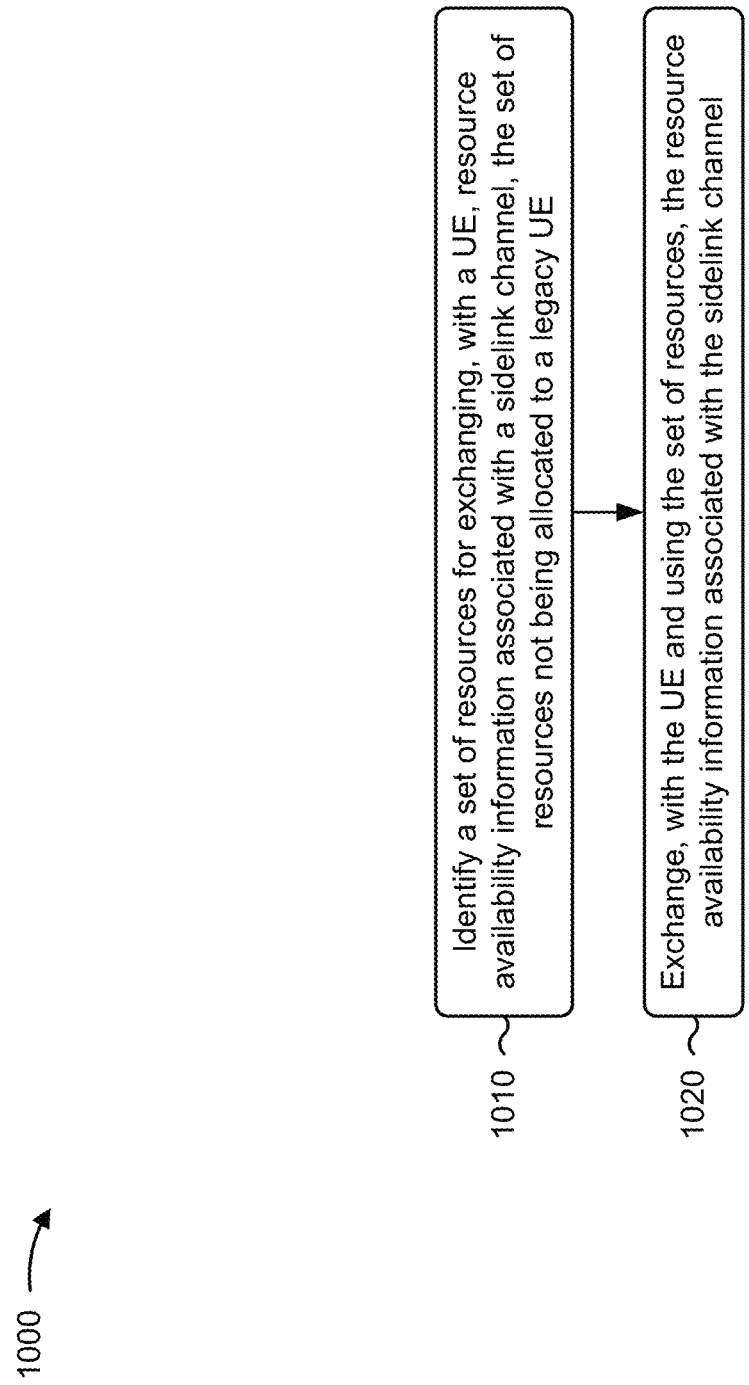
FIGS. 10, 11, 12, 13, and 14 are diagrams illustrating example processes associated with communication about sidelink resource availability without interference from legacy UEs, in accordance with the present disclosure.

FIG. 10 is a diagram illustrating an example process 1000 performed, for example, by a first UE, in accordance with the present disclosure. Example process 1000 is an example where the first UE (e.g., UE 120 and/or apparatus 1500 of FIG. 15) performs operations associated with communicating about sidelink resource availability without interference from legacy UEs.

As shown in FIG. 10, in some aspects, process 1000 may include identifying a set of resources for exchanging, with a second UE, resource availability information associated with a sidelink channel (block 1010). For example, the first UE (e.g., using identification component 1508, depicted in FIG. 15) may identify a set of resources for exchanging, with a second UE, resource availability information associated with a sidelink channel, as described herein. In some aspects, the set of resources are not allocated to a legacy UE.

As further shown in FIG. 10, in some aspects, process 1000 may include exchanging, with the second UE and using the set of resources, the resource availability information associated with the sidelink channel (block 1020). For example, the first UE (e.g., using transmission component 1504, depicted in FIG. 15) may exchange, with the second UE and using the set of resources, the resource availability information associated with the sidelink channel, as described herein.

Process 1000 may include additional aspects, such as any single aspect or any combination of aspects described below and/or in connection with one or more other processes described elsewhere herein.

In a first aspect, process 1000 further includes transmitting (e.g., using transmission component 1504), to a third UE, a communication on the sidelink channel, using one or more resources determined based at least in part on the resource availability information.

In a second aspect, alone or in combination with the first aspect, the communication is transmitted on one or more resources that are shared with the legacy UE.

In a third aspect, alone or in combination with one or more of the first and second aspects, exchanging the resource availability information includes transmitting (e.g., using transmission component 1504), to the second UE and using the set of resources, a request for the resource availability information associated with the sidelink channel.

In a fourth aspect, alone or in combination with one or more of the first through third aspects, the request is scheduled by SCI.

In a fifth aspect, alone or in combination with one or more of the first through fourth aspects, the communication is scheduled by additional SCI.

In a sixth aspect, alone or in combination with one or more of the first through fifth aspects, exchanging the resource availability information includes receiving (e.g., using reception component 1502, depicted in FIG. 15), from the second UE and using the set of resources, the resource availability information associated with the sidelink channel.

In a seventh aspect, alone or in combination with one or more of the first through sixth aspects, exchanging the resource availability information includes receiving (e.g., using reception component 1502), from the second UE and using the set of resources, a request for the resource availability information associated with the sidelink channel.

In a eighth aspect, alone or in combination with one or more of the first through seventh aspects, exchanging the resource availability information includes transmitting (e.g., using transmission component 1504), to the second UE and using the set of resources, the resource availability information associated with the sidelink channel.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
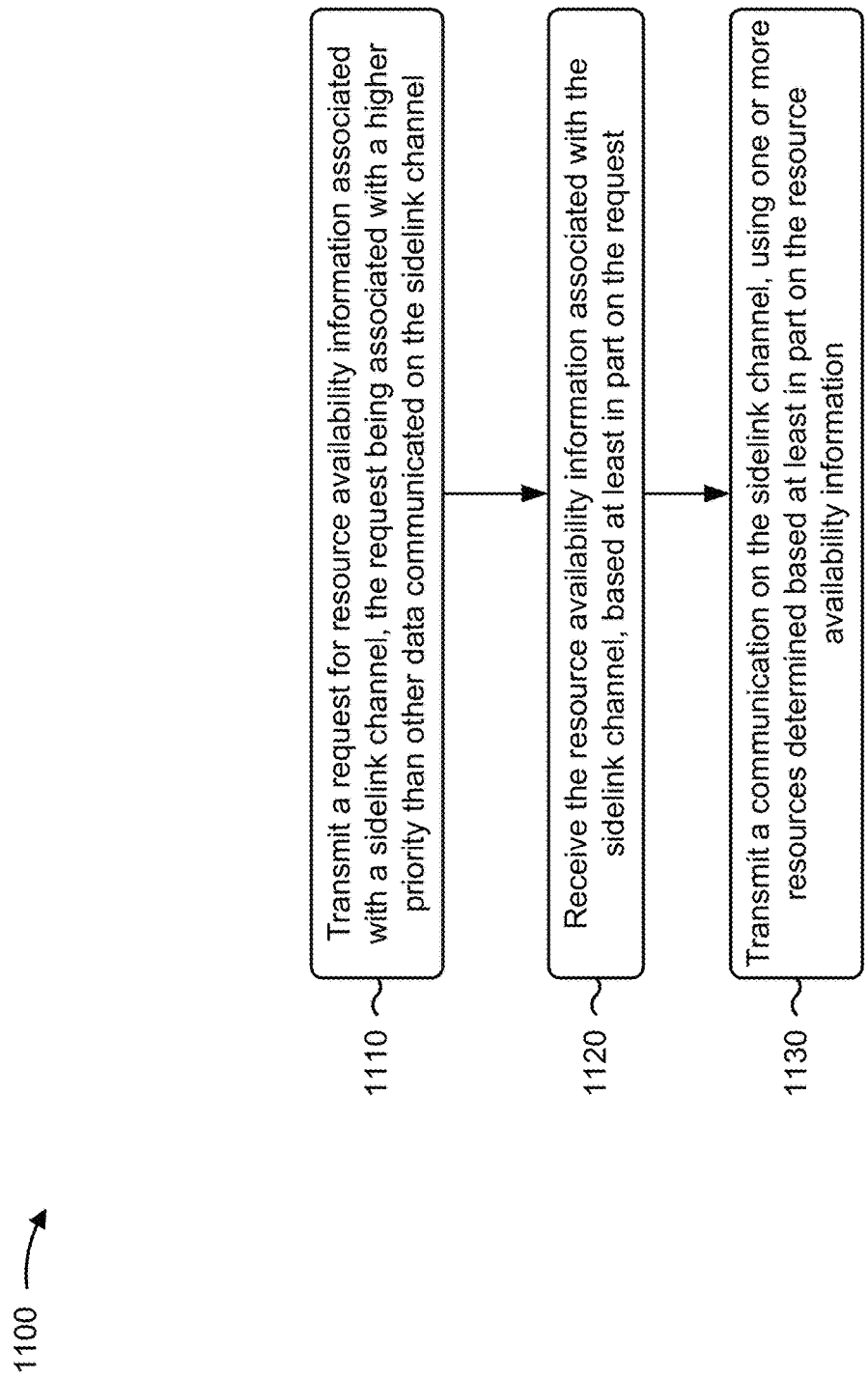

FIG. 11 is a diagram illustrating an example process 1100 performed, for example, by a first UE, in accordance with the present disclosure. Example process 1100 is an example where the first UE (e.g., UE 120 and/or apparatus 1500 of FIG. 15) performs operations associated with communicating about sidelink resource availability without interference from legacy UEs.

As shown in FIG. 11, in some aspects, process 1100 may include transmitting, to a second UE, a request for resource availability information associated with a sidelink channel (block 1110). For example, the first UE (e.g., using transmission component 1504, depicted in FIG. 15) may transmit, to a second UE, a request for resource availability information associated with a sidelink channel, as described herein. In some aspects, the request is associated with a higher priority than other data communicated on the sidelink channel.

As further shown in FIG. 11, in some aspects, process 1100 may include receiving, from the second UE, the resource availability information associated with the sidelink channel, based at least in part on the request (block 1120). For example, the first UE (e.g., using reception component 1502, depicted in FIG. 15) may receive, from the second UE, the resource availability information associated with the sidelink channel, based at least in part on the request, as described herein.

As further shown in FIG. 11, in some aspects, process 1100 may include transmitting, to a third UE, a communication on the sidelink channel, using one or more resources determined based at least in part on the resource availability information (block 1130). For example, the first UE (e.g., using transmission component 1504) may transmit, to the third UE, a communication on the sidelink channel, using one or more resources determined based at least in part on the resource availability information, as described herein.

Process 1100 may include additional aspects, such as any single aspect or any combination of aspects described below and/or in connection with one or more other processes described elsewhere herein.

In a first aspect, the request is scheduled by SCI, and the SCI indicates the higher priority.

In a second aspect, alone or in combination with the first aspect, the communication is scheduled by additional SCI.

In a third aspect, alone or in combination with one or more of the first and second aspects, the request is transmitted on one or more resources that were reserved by a fourth UE.

In a fourth aspect, alone or in combination with one or more of the first through third aspects, process 1100 further includes contending (e.g., using contention component 1510, depicted in FIG. 15) for the one or more resources that were reserved by the fourth UE, such that the request is transmitted on the one or more resources based at least in part on contending for the one or more resources that were reserved by the fourth UE.

In a fifth aspect, alone or in combination with one or more of the first and fourth aspects, the request is transmitted on one or more resources that were reserved by the first UE.

In a sixth aspect, alone or in combination with one or more of the first through fifth aspects, the resource availability information is received on one or more resources that were reserved by a fourth UE.

In a seventh aspect, alone or in combination with one or more of the first through sixth aspects, the resource availability information is received on one or more resources that were reserved by the first UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
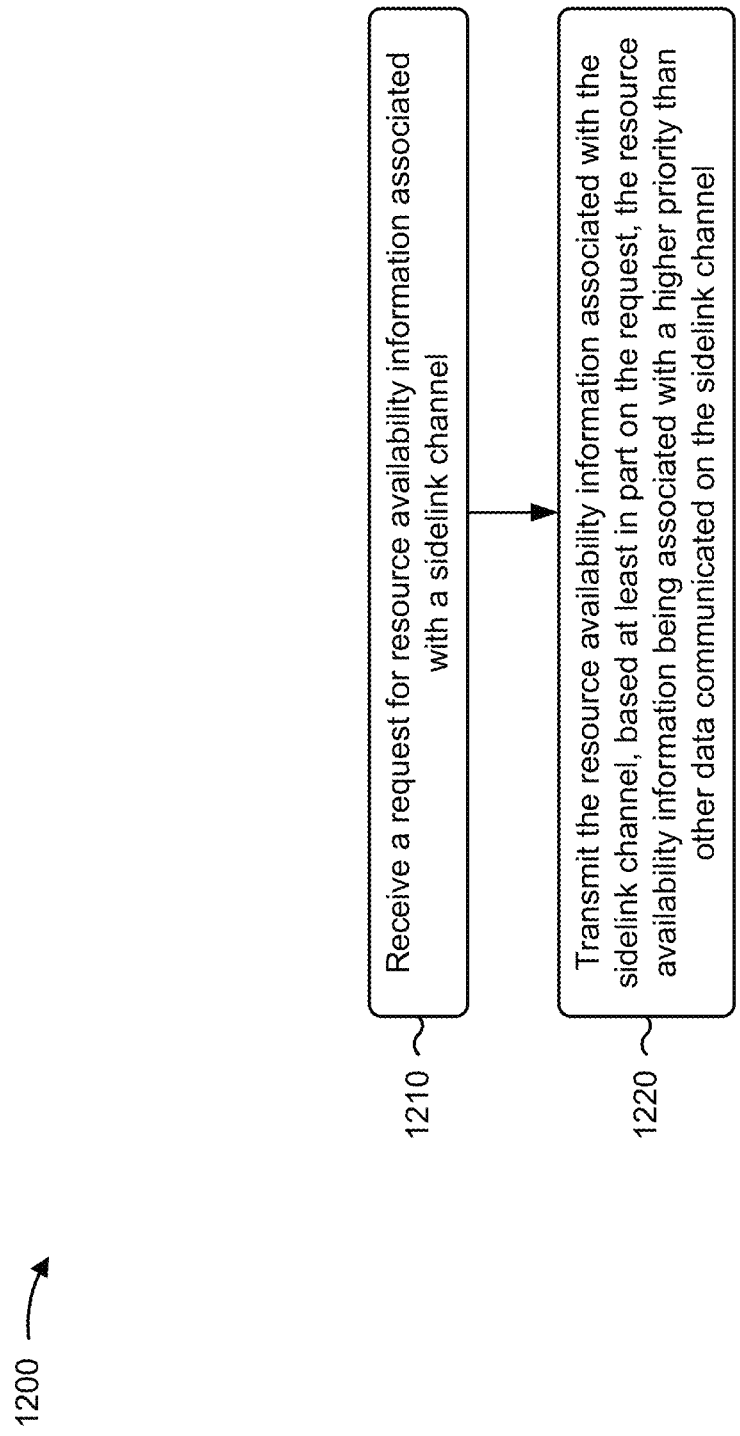

FIG. 12 is a diagram illustrating an example process 1200 performed, for example, by a first UE, in accordance with the present disclosure. Example process 1200 is an example where the first UE (e.g., UE 120 and/or apparatus 1500 of FIG. 15) performs operations associated with communicating about sidelink resource availability without interference from legacy UEs.

As shown in FIG. 12, in some aspects, process 1200 may include receiving, from a second UE, a request for resource availability information associated with a sidelink channel (block 1210). For example, the first UE (e.g., using reception component 1502, depicted in FIG. 15) may receive, from a second UE, a request for resource availability information associated with a sidelink channel, as described herein.

As further shown in FIG. 12, in some aspects, process 1200 may include transmitting, to the second UE, the resource availability information associated with the sidelink channel, based at least in part on receiving the request (block 1220). For example, the first UE (e.g., using transmission component 1504, depicted in FIG. 15) may transmit, to the second UE, the resource availability information associated with the sidelink channel, based at least in part on the request, as described herein. In some aspects, the resource availability information is associated with a higher priority than other data communicated on the sidelink channel.

Process 1200 may include additional aspects, such as any single aspect or any combination of aspects described below and/or in connection with one or more other processes described elsewhere herein.

In a first aspect, the request is scheduled by SCI, and the SCI indicates the higher priority.

In a second aspect, alone or in combination with the first aspect, the resource availability information is transmitted on one or more resources that were reserved by a third UE.

In a third aspect, alone or in combination with one or more of the first and second aspects, process 1200 further includes contending (e.g., using contention component 1510, depicted in FIG. 15) for the one or more resources that were reserved by the third UE, such that the resource availability information is transmitted on the one or more resources based at least in part on contending for the one or more resources that were reserved by the third UE.

In a fourth aspect, alone or in combination with one or more of the first through third aspects, the resource availability information is transmitted on one or more resources that were reserved by the first UE.

In a fifth aspect, alone or in combination with one or more of the first through fourth aspects, the request is received on one or more resources that were reserved by a third UE.

In a sixth aspect, alone or in combination with one or more of the first through fifth aspects, the request is received on one or more resources that were reserved by the first UE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
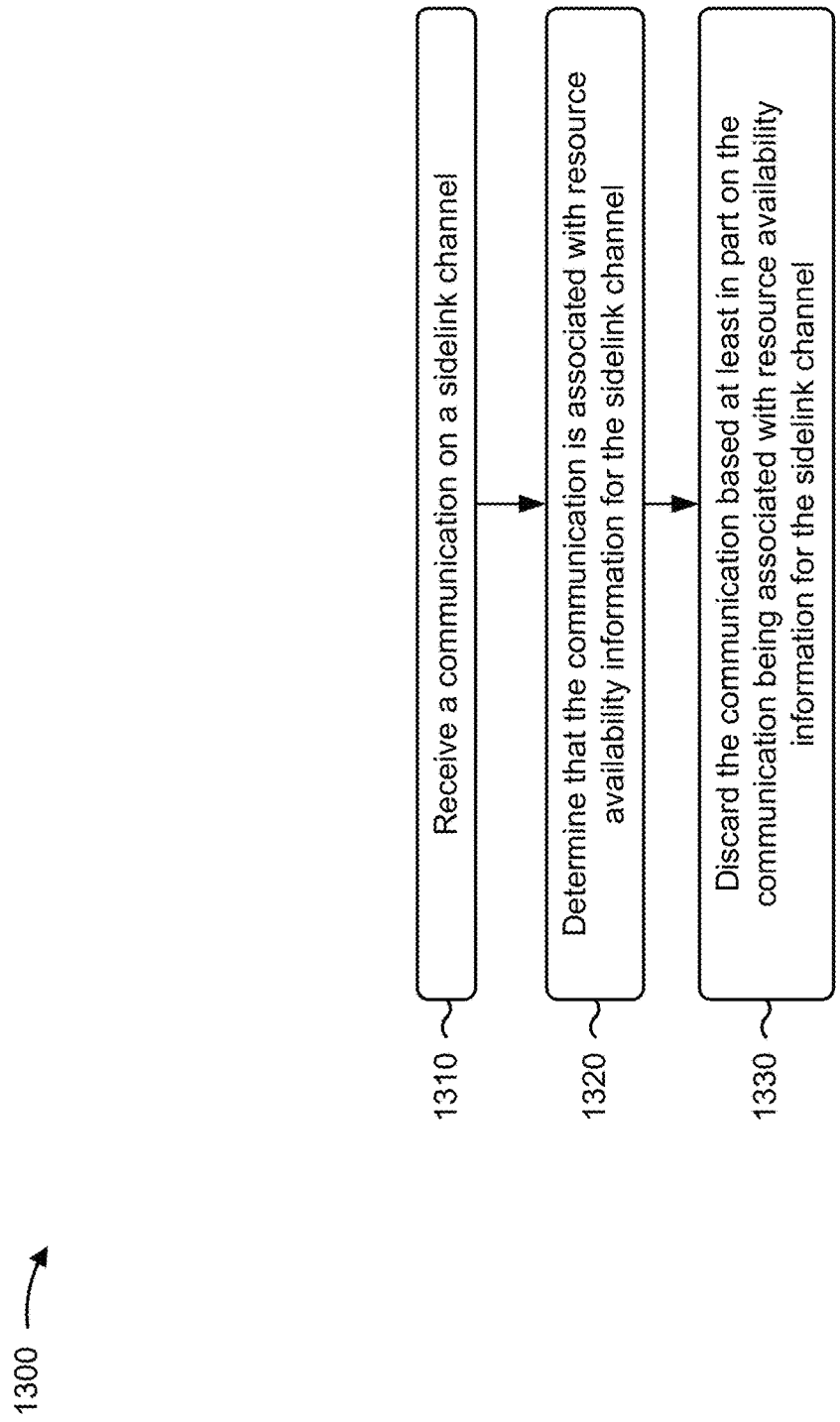

FIG. 13 is a diagram illustrating an example process 1300 performed, for example, by a first UE, in accordance with the present disclosure. Example process 1300 is an example where the first UE (e.g., UE 120 and/or apparatus 1500 of FIG. 15) performs operations associated with communicating about sidelink resource availability without interference from legacy UEs.

As shown in FIG. 13, in some aspects, process 1300 may include receiving, from a second UE, a communication on a sidelink channel (block 1310). For example, the UE (e.g., using reception component 1502, depicted in FIG. 15) may receive, from a second UE, a communication on a sidelink channel, as described herein.

As further shown in FIG. 13, in some aspects, process 1300 may include determining that the communication is associated with resource availability information for the sidelink channel (block 1320). For example, the first UE (e.g., using determination component 1514, depicted in FIG. 15) may determine that the communication is associated with resource availability information for the sidelink channel, as described herein.

As further shown in FIG. 13, in some aspects, process 1300 may include discarding the communication based at least in part on the communication being associated with resource availability information for the sidelink channel (block 1330). For example, the first UE (e.g., using discarding component 1516, depicted in FIG. 15) may discard the communication based at least in part on the communication being associated with resource availability information for the sidelink channel, as described herein.

Process 1300 may include additional aspects, such as any single aspect or any combination of aspects described below and/or in connection with one or more other processes described elsewhere herein.

Figure 15:
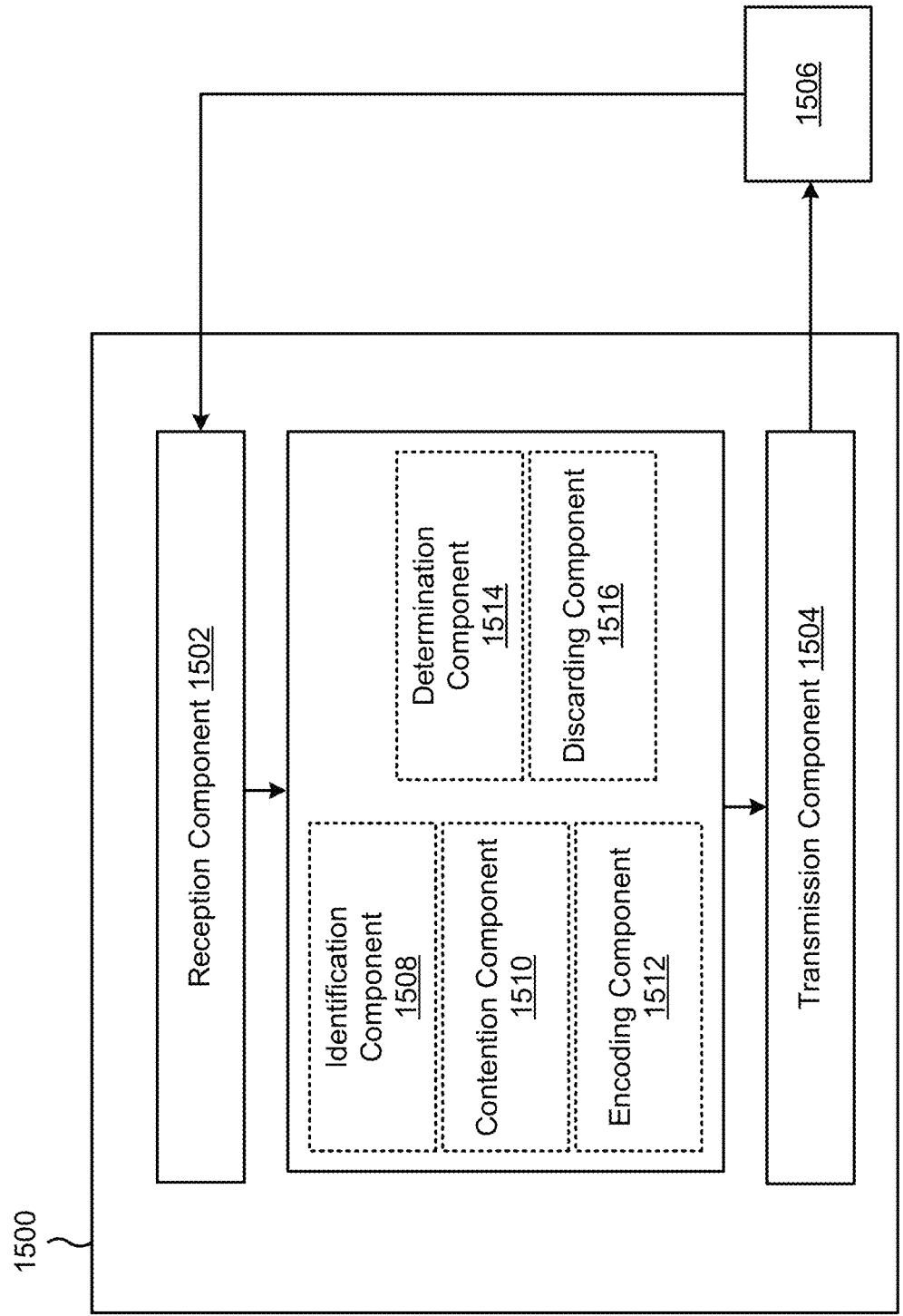
FIGS. 15 and 16 are diagrams of example apparatuses for wireless communication, in accordance with the present disclosure.

In a first aspect, process 1300 further includes identifying (e.g., using identification component 1508, depicted in FIG. 15) a set of resources associated with the communication on the sidelink channel, and refraining (e.g., using reception component 1502 and/or transmission component 1504, depicted in FIG. 15) from using the set of resources on the sidelink channel.

In a second aspect, alone or in combination with the first aspect, the set of resources are identified based at least in part on SCI that reserves the set of resources.

In a third aspect, alone or in combination with one or more of the first and second aspects, the communication includes at least one of a request for the resource availability information for the sidelink channel or a response including the resource availability information for the sidelink channel.

In a fourth aspect, alone or in combination with one or more of the first through third aspects, determining that the communication is associated with resource availability information for the sidelink channel is based at least in part on a priority associated with the communication.

In a fifth aspect, alone or in combination with one or more of the first through fourth aspects, the priority associated with the communication is indicated in SCI.

In a sixth aspect, alone or in combination with one or more of the first through fifth aspects, determining that the communication is associated with resource availability information for the sidelink channel is based at least in part on a destination identifier associated with the communication.

In a seventh aspect, alone or in combination with one or more of the first through sixth aspects, the destination identifier is indicated in SCI.

In an eighth aspect, alone or in combination with one or more of the first through seventh aspects, the destination identifier includes a group identifier associated with a group of UEs that does not include the first UE.

In a ninth aspect, alone or in combination with one or more of the first through eighth aspects, the destination identifier includes a specific identifier that is not associated with the first UE.

In a tenth aspect, alone or in combination with one or more of the first through ninth aspects, determining that the communication is associated with resource availability information for the sidelink channel is based at least in part on a message type field associated with the communication.

In an eleventh aspect, alone or in combination with one or more of the first through tenth aspects, the message type field is included in SCI.

In a twelfth aspect, alone or in combination with one or more of the first through eleventh aspects, determining that the communication is associated with resource availability information for the sidelink channel is based at least in part on a format of SCI scheduling the communication.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
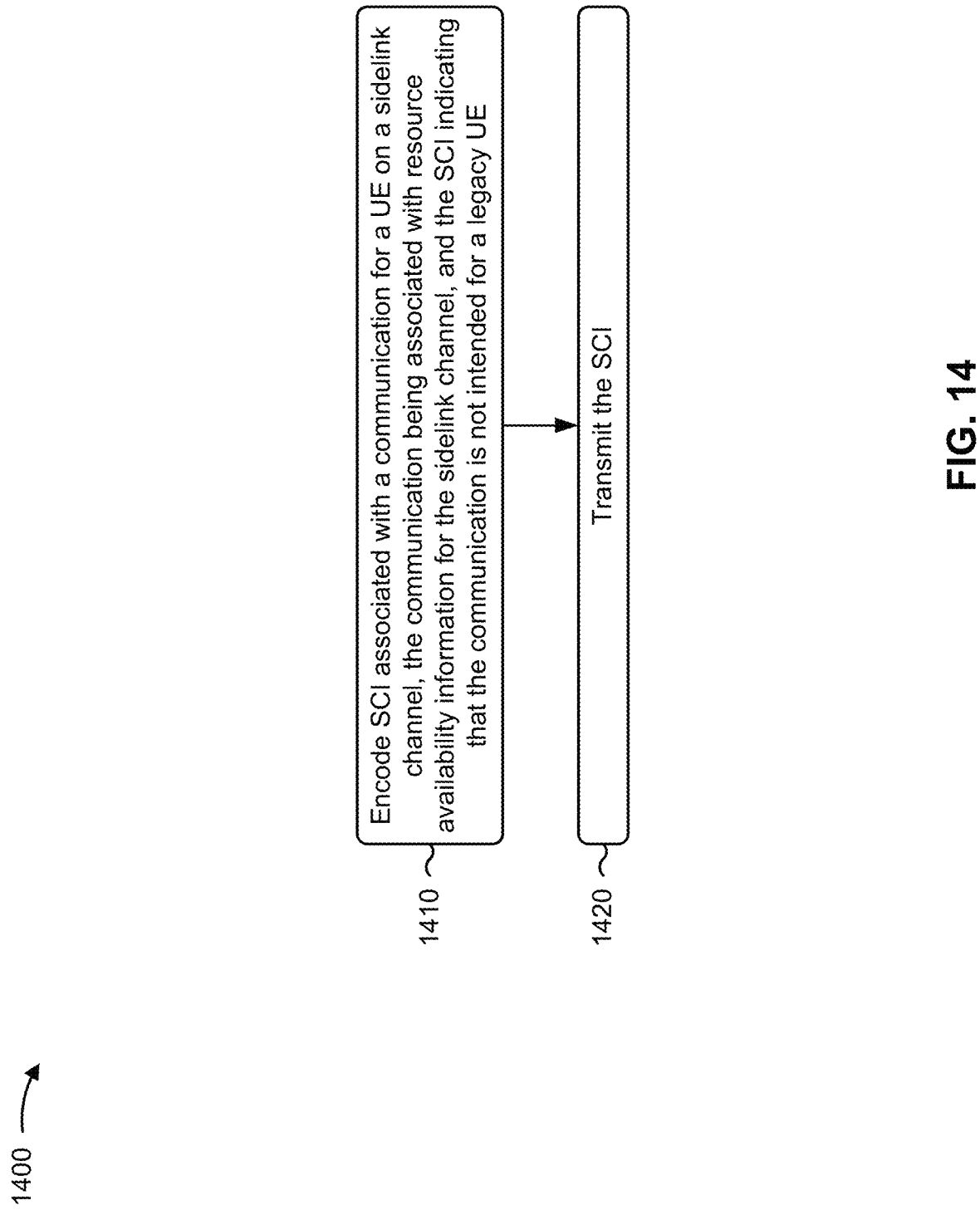

FIG. 14 is a diagram illustrating an example process 1400 performed, for example, by a first UE, in accordance with the present disclosure. Example process 1400 is an example where the first UE (e.g., UE 120 and/or apparatus 1500 of FIG. 15) performs operations associated with communicating about sidelink resource availability without interference from legacy UEs.

As shown in FIG. 14, in some aspects, process 1400 may include encoding SCI associated with a communication for a second UE on a sidelink channel (block 1410). For example, the first UE (e.g., using encoding component 1512, depicted in FIG. 15) may encode SCI associated with a communication for a second UE on a sidelink channel, as described herein. In some aspects, the communication is associated with resource availability information for the sidelink channel, and the SCI indicates that the communication is not intended for a legacy UE.

As further shown in FIG. 14, in some aspects, process 1400 may include transmitting, to the legacy UE, the SCI (block 1420). For example, the first UE (e.g., using transmission component 1504, depicted in FIG. 15) may transmit, to the legacy UE, the SCI, as described herein.

Process 1400 may include additional aspects, such as any single aspect or any combination of aspects described below and/or in connection with one or more other processes described elsewhere herein.

In a first aspect, the communication includes at least one of a request for the resource availability information for the sidelink channel or a response including the resource availability information for the sidelink channel.

In a second aspect, alone or in combination with the first aspect, the SCI indicates that the communication is not intended for the legacy UE based at least in part on a priority indicated in the SCI and associated with the communication.

In a third aspect, alone or in combination with one or more of the first and second aspects, the SCI indicates that the communication is not intended for the legacy UE based at least in part on a destination identifier included in the SCI and associated with the communication.

In a fourth aspect, alone or in combination with one or more of the first through third aspects, the destination identifier includes a group identifier associated with a group of UEs that does not include the legacy UE.

In a fifth aspect, alone or in combination with one or more of the first through fourth aspects, the destination identifier includes a specific identifier that is not associated with the legacy UE.

In a sixth aspect, alone or in combination with one or more of the first through fifth aspects, the SCI indicates that the communication is not intended for the legacy UE based at least in part on a message type field included in the SCI and associated with the communication.

In a seventh aspect, alone or in combination with one or more of the first through sixth aspects, the SCI indicates that the communication is not intended for the legacy UE based at least in part on a format of the SCI.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

FIG. 15 is a block diagram of an example apparatus 1500 for wireless communication. The apparatus 1500 may be a first UE, or a first UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a second UE, a legacy UE, a base station, or another wireless communication device) using the reception component 1502 and the transmission component 1504. As further shown, the apparatus 1500 may include one or more of an identification component 1508, a contention component 1510, an encoding component 1512, a determination component 1514, or a discarding component 1516, among other examples.

In some aspects, the apparatus 1500 may be configured to perform one or more operations described herein in connection with FIGS. 5-9. Additionally, or alternatively, the apparatus 1500 may be configured to perform one or more processes described herein, such as process 1000 of FIG. 10, process 1100 of FIG. 11, process 1200 of FIG. 12, process 1300 of FIG. 13, process 1400 of FIG. 14, or a combination thereof. In some aspects, the apparatus 1500 and/or one or more components shown in FIG. 15 may include one or more components of the UE described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a MIMO detector, a receive processor, a controller/processor, a memory, or a combination thereof, of the UE described above in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a transmit MIMO processor, a transmit processor, a controller/processor, a memory, or a combination thereof, of the UE described above in connection with FIG. 2. In some aspects, the transmission component 1504 may be co-located with the reception component 1502 in a transceiver.

In some aspects, the identification component 1508 may identify a set of resources for exchanging, with the apparatus 1506, resource availability information associated with a sidelink channel. The set of resources may not be allocated to a legacy UE. In some aspects, the identification component 1508 may include one or more antennas, a modem, a MIMO detector, a receive processor, a transmit MIMO processor, a transmit processor, a controller/processor, a memory, or a combination thereof, of the UE described above in connection with FIG. 2. The transmission component 1504 and/or the reception component 1502 may exchange, with the apparatus 1506 and using the set of resources, the resource availability information associated with the sidelink channel. In some aspects, the transmission component 1504 may further transmit, to another UE, a communication on the sidelink channel, using one or more resources determined based at least in part on the resource availability information.

In some aspects, the transmission component 1504 may transmit, to the apparatus 1506, a request for resource availability information associated with a sidelink channel. The request may be associated with a higher priority than other data communicated on the sidelink channel. The reception component 1502 may receive, from the apparatus 1506, the resource availability information associated with the sidelink channel, based at least in part on the transmission component 1504 transmitting the request. The transmission component 1504 may further transmit, to another UE, a communication on the sidelink channel, using one or more resources determined based at least in part on the resource availability information. In some aspects, the contention component 1510 may contend for the one or more resources that the transmission component 1504 uses to transmit the request. In some aspects, the contention component 1510 may include one or more antennas, a modem, a MIMO detector, a receive processor, a transmit MIMO processor, a transmit processor, a controller/processor, a memory, or a combination thereof, of the UE described above in connection with FIG. 2.

In some aspects, the reception component 1502 may receive, from the apparatus 1506, a request for resource availability information associated with a sidelink channel. The transmission component 1504 may transmit, to the apparatus 1506, the resource availability information associated with the sidelink channel, based at least in part on the reception component 1502 receiving the request. The resource availability information may be associated with a higher priority than other data communicated on the sidelink channel. In some aspects, the contention component 1510 may contend for the one or more resources that the transmission component 1504 uses to transmit the resource availability information.

In some aspects, the encoding component 1512 may encode SCI associated with a communication on a sidelink channel. The communication may be associated with resource availability information for the sidelink channel, and the SCI may indicate that the communication is not intended for a legacy UE. In some aspects, the encoding component 1512 may include a modem, a transmit MIMO processor, a transmit processor, a controller/processor, a memory, or a combination thereof, of the UE described above in connection with FIG. 2. The transmission component 1504 may further transmit, to the legacy UE, the SCI.

In some aspects, the apparatus 1500 may be a legacy UE. Accordingly, in some aspects, the reception component 1502 may receive, from the apparatus 1506, a communication on a sidelink channel. The determination component 1514 may determine that the communication is associated with resource availability information for the sidelink channel. In some aspects, the determination component 1514 may include a modem, a MIMO detector, a receive processor, a controller/processor, a memory, or a combination thereof, of the UE described above in connection with FIG. 2. The discarding component 1516 may discard the communication based at least in part on the communication being associated with resource availability information for the sidelink channel. In some aspects, the discarding component 1516 may include a receive processor, a controller/processor, a memory, or a combination thereof, of the UE described above in connection with FIG. 2. In some aspects, the identification component 1508 may further identify a set of resources associated with the communication on the sidelink channel. Accordingly, the reception component 1502 and/or the transmission component 1504 may refrain from using the set of resources on the sidelink channel.

The number and arrangement of components shown in FIG. 15 are provided as an example. In practice, there may be additional components, fewer components, different components, or differently arranged components than those shown in FIG. 15.

Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
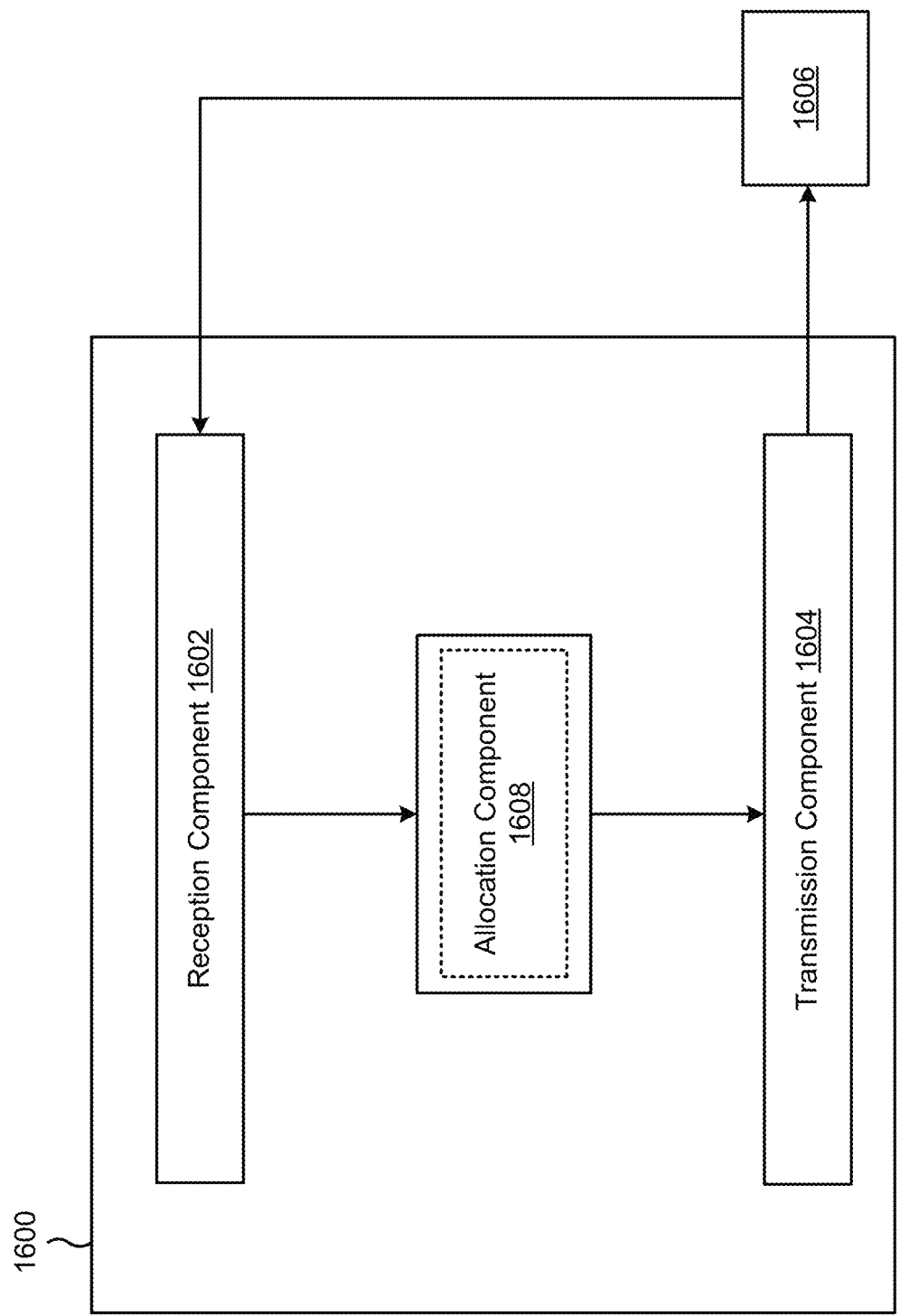

FIG. 16 is a block diagram of an example apparatus 1600 for wireless communication. The apparatus 1600 may be a base station, or a base station may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include an allocation component 1608, among other examples.

In some aspects, the apparatus 1600 may be configured to perform one or more operations described herein in connection with FIGS. 5-9. Additionally, or alternatively, the apparatus 1600 may be configured to perform one or more processes described herein, or a combination thereof. In some aspects, the apparatus 1600 and/or one or more components shown in FIG. 16 may include one or more components of the base station described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a MIMO detector, a receive processor, a controller/processor, a memory, or a combination thereof, of the base station described above in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a transmit MIMO processor, a transmit processor, a controller/processor, a memory, or a combination thereof, of the base station described above in connection with FIG. 2. In some aspects, the transmission component 1604 may be co-located with the reception component 1602 in a transceiver.

In some aspects, the allocation component 1608 may allocate a set of resources for exchanging resource availability information associated with a sidelink channel to the apparatus 1606 and not to a legacy UE. In some aspects, the allocation component 1608 may include a transmit MIMO processor, a transmit processor, a controller/processor, a memory, or a combination thereof, of the base station described above in connection with FIG. 2. The transmission component 1604 may transmit (e.g., using RRC signaling) a grant of this set of resources to the apparatus 1606.

Additionally, or alternatively, the allocation component 1608 may allocate another set of resources for the sidelink channel to the apparatus 1606 and to the legacy UE. The transmission component 1604 may transmit (e.g., using RRC signaling) a grant of this set of resources to the apparatus 1606 and to the legacy UE.

In any of the aspects described above, the reception component 1602 may receive information associated with the sidelink channel (e.g., RSRP measurements, one or more CQIs, and/or a CSI report, among other examples) from the apparatus 1606, the legacy UE, and/or one or more additional apparatuses. Accordingly, the allocation component 1608 may allocate one or more sets of resources (e.g., as described above) based at least in part on the information received by the reception component 1602.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a first user equipment (UE), comprising: identifying a set of resources for exchanging, with a second UE, resource availability information associated with a sidelink channel, wherein the set of resources are not allocated to a legacy UE; and exchanging, with the second UE and using the set of resources, the resource availability information associated with the sidelink channel.

Aspect 2: The method of Aspect 1, further comprising: transmitting, to a third UE, a communication on the sidelink channel, using one or more resources determined based at least in part on the resource availability information.

Aspect 3: The method of Aspect 2, wherein the communication is transmitted on one or more resources that are shared with the legacy UE.

Aspect 4: The method of any of Aspects 2 through 3, wherein the communication is scheduled by sidelink control information (SCI).

Aspect 5: The method of any of Aspects 1 through 4, wherein exchanging the resource availability information comprises: receiving, from the second UE and using the set of resources, the resource availability information associated with the sidelink channel.

Aspect 6: The method of Aspect 5, wherein exchanging the resource availability information further comprises: transmitting, to the second UE and using the set of resources, a request for the resource availability information associated with the sidelink channel.

Aspect 7: The method of Aspect 6, wherein the request is scheduled by sidelink control information (SCI).

Aspect 8: The method of any of Aspects 1 through 4, wherein exchanging the resource availability information comprises: transmitting, to the second UE and using the set of resources, the resource availability information associated with the sidelink channel.

Aspect 9: The method of Aspect 8, wherein exchanging the resource availability information further comprises: receiving, from the second UE and using the set of resources, a request for the resource availability information associated with the sidelink channel.

Aspect 10: The method of Aspect 9, wherein the request is scheduled by sidelink control information (SCI).

Aspect 11: A method of wireless communication performed by a first user equipment (UE), comprising: transmitting, to a second UE, a request for resource availability information associated with a sidelink channel, wherein the request is associated with a higher priority than other data communicated on the sidelink channel; receiving, from the second UE, the resource availability information associated with the sidelink channel, based at least in part on the request; and transmitting, to a third UE, a communication on the sidelink channel, using one or more resources determined based at least in part on the resource availability information.

Aspect 12: The method of Aspect 11, wherein the request is scheduled by sidelink control information (SCI), and wherein the SCI indicates the higher priority.

Aspect 13: The method of any of Aspects 11 through 12, wherein the communication is scheduled by sidelink control information (SCI).

Aspect 14: The method of any of Aspects 11 through 13, wherein the request is transmitted on one or more resources that were reserved by a fourth UE.

Aspect 15: The method of Aspect 14, further comprising: contending for the one or more resources that were reserved by the fourth UE, wherein the request is transmitted on the one or more resources based at least in part on contending for the one or more resources that were reserved by the fourth UE.

Aspect 16: The method of any of Aspects 11 through 13, wherein the request is transmitted on one or more resources that were reserved by the first UE.

Aspect 17: The method of any of Aspects 11 through 16, wherein the resource availability information is received on one or more resources that were reserved by a fourth UE.

Aspect 18: The method of any of Aspects 11 through 16, wherein the resource availability information is received on one or more resources that were reserved by the first UE.

Aspect 19: A method of wireless communication performed by a first user equipment (UE), comprising: receiving, from a second UE, a request for resource availability information associated with a sidelink channel; and transmitting, to the second UE, the resource availability information associated with the sidelink channel, based at least in part on the request, wherein the resource availability information is associated with a higher priority than other data communicated on the sidelink channel.

Aspect 20: The method of Aspect 19, wherein the request is scheduled by sidelink control information (SCI), and wherein the SCI indicates the higher priority.

Aspect 21: The method of any of Aspects 19 through 20, wherein the resource availability information is transmitted on one or more resources that were reserved by a third UE.

Aspect 22: The method of Aspect 20, further comprising: contending for the one or more resources that were reserved by the third UE, wherein the resource availability information is transmitted on the one or more resources based at least in part on contending for the one or more resources that were reserved by the third UE.

Aspect 23: The method of any of Aspects 19 through 2, wherein the resource availability information is transmitted on one or more resources that were reserved by the first UE.

Aspect 24: The method of any of Aspects 19 through 23, wherein the request is received on one or more resources that were reserved by a third UE.

Aspect 25: The method of any of Aspects 19 through 23, wherein the request is received on one or more resources that were reserved by the first UE.

Aspect 26: A method of wireless communication performed by a first user equipment (UE), comprising: receiving, from a second UE, a communication on a sidelink channel; determining that the communication is associated with resource availability information for the sidelink channel; and discarding the communication based at least in part on the communication being associated with resource availability information for the sidelink channel.

Aspect 27: The method of Aspect 26, further comprising: identifying a set of resources associated with the communication on the sidelink channel; and refraining from using the set of resources on the sidelink channel.

Aspect 28: The method of Aspect 27, wherein the set of resources are identified based at least in part on sidelink control information (SCI) that reserves the set of resources.

Aspect 29: The method of any of Aspects 26 through 28, wherein the communication includes at least one of a request for the resource availability information for the sidelink channel or a response including the resource availability information for the sidelink channel.

Aspect 30: The method of any of Aspects 26 through 29, wherein determining that the communication is associated with resource availability information for the sidelink channel is based at least in part on a priority associated with the communication.

Aspect 31: The method of Aspect 30, wherein the priority associated with the communication is indicated in SCI.

Aspect 32: The method of any of Aspects 26 through 31, wherein determining that the communication is associated with resource availability information for the sidelink channel is based at least in part on a destination identifier associated with the communication.

Aspect 33: The method of Aspect 32, wherein the destination identifier is indicated in SCI.

Aspect 34: The method of any of Aspects 32 through 33, wherein the destination identifier includes a group identifier associated with a group of UEs that does not include the first UE.

Aspect 35: The method of any of Aspects 32 through 33, wherein the destination identifier includes a specific identifier that is not associated with the first UE.

Aspect 36: The method of any of Aspects 26 through 35, wherein determining that the communication is associated with resource availability information for the sidelink channel is based at least in part on a message type field associated with the communication.

Aspect 37: The method of Aspect 36, wherein the message type field is included in SCI.

Aspect 38: The method of any of Aspects 26 through 37, wherein determining that the communication is associated with resource availability information for the sidelink channel is based at least in part on a format of SCI scheduling the communication.

Aspect 39: A method of wireless communication performed by a first user equipment (UE), comprising: encoding sidelink control information (SCI) associated with a communication for a second UE on a sidelink channel, wherein the communication is associated with resource availability information for the sidelink channel, and wherein the SCI indicates that the communication is not intended for a legacy UE; and transmitting, to the legacy UE, the SCI.

Aspect 40: The method of Aspect 39, wherein the communication includes at least one of a request for the resource availability information for the sidelink channel or a response including the resource availability information for the sidelink channel.

Aspect 41: The method of any of Aspects 39 through 40, wherein the SCI indicates that the communication is not intended for the legacy UE based at least in part on a priority indicated in the SCI and associated with the communication.

Aspect 42: The method of any of Aspects 39 through 41, wherein the SCI indicates that the communication is not intended for the legacy UE based at least in part on a destination identifier included in the SCI and associated with the communication.

Aspect 43: The method of Aspect 42, wherein the destination identifier includes a group identifier associated with a group of UEs that does not include the legacy UE.

Aspect 44: The method of Aspect 42, wherein the destination identifier includes a specific identifier that is not associated with the legacy UE.

Aspect 45: The method of any of Aspects 39 through 44, wherein the SCI indicates that the communication is not intended for the legacy UE based at least in part on a message type field included in the SCI and associated with the communication.

Aspect 46: The method of any of Aspects 39 through 45, wherein the SCI indicates that the communication is not intended for the legacy UE based at least in part on a format of the SCI.

Aspect 47: An apparatus for wireless communication at a device, comprising a processor; memory coupled with the processor; and instructions stored in the memory and executable by the processor to cause the apparatus to perform the method of one or more of Aspects 1-10.

Aspect 48: A device for wireless communication, comprising a memory and one or more processors coupled to the memory, the one or more processors configured to perform the method of one or more of Aspects 1-10.

Aspect 49: An apparatus for wireless communication, comprising at least one means for performing the method of one or more of Aspects 1-10.

Aspect 50: A non-transitory computer-readable medium storing code for wireless communication, the code comprising instructions executable by a processor to perform the method of one or more of Aspects 1-10.

Aspect 51: A non-transitory computer-readable medium storing a set of instructions for wireless communication, the set of instructions comprising one or more instructions that, when executed by one or more processors of a device, cause the device to perform the method of one or more of Aspects 1-10.

Aspect 52: An apparatus for wireless communication at a device, comprising a processor; memory coupled with the processor; and instructions stored in the memory and executable by the processor to cause the apparatus to perform the method of one or more of Aspects 11-18.

Aspect 53: A device for wireless communication, comprising a memory and one or more processors coupled to the memory, the one or more processors configured to perform the method of one or more of Aspects 11-18.

Aspect 54: An apparatus for wireless communication, comprising at least one means for performing the method of one or more of Aspects 11-18.

Aspect 55: A non-transitory computer-readable medium storing code for wireless communication, the code comprising instructions executable by a processor to perform the method of one or more of Aspects 11-18.

Aspect 56: A non-transitory computer-readable medium storing a set of instructions for wireless communication, the set of instructions comprising one or more instructions that, when executed by one or more processors of a device, cause the device to perform the method of one or more of Aspects 11-18.

Aspect 57: An apparatus for wireless communication at a device, comprising a processor; memory coupled with the processor; and instructions stored in the memory and executable by the processor to cause the apparatus to perform the method of one or more of Aspects 19-25.

Aspect 58: A device for wireless communication, comprising a memory and one or more processors coupled to the memory, the one or more processors configured to perform the method of one or more of Aspects 19-25.

Aspect 59: An apparatus for wireless communication, comprising at least one means for performing the method of one or more of Aspects 19-25.

Aspect 60: A non-transitory computer-readable medium storing code for wireless communication, the code comprising instructions executable by a processor to perform the method of one or more of Aspects 19-25.

Aspect 61: A non-transitory computer-readable medium storing a set of instructions for wireless communication, the set of instructions comprising one or more instructions that, when executed by one or more processors of a device, cause the device to perform the method of one or more of Aspects 19-25.

Aspect 62: An apparatus for wireless communication at a device, comprising a processor; memory coupled with the processor; and instructions stored in the memory and executable by the processor to cause the apparatus to perform the method of one or more of Aspects 26-38.

Aspect 63: A device for wireless communication, comprising a memory and one or more processors coupled to the memory, the one or more processors configured to perform the method of one or more of Aspects 26-38.

Aspect 64: An apparatus for wireless communication, comprising at least one means for performing the method of one or more of Aspects 26-38.

Aspect 65: A non-transitory computer-readable medium storing code for wireless communication, the code comprising instructions executable by a processor to perform the method of one or more of Aspects 26-38.

Aspect 66: A non-transitory computer-readable medium storing a set of instructions for wireless communication, the set of instructions comprising one or more instructions that, when executed by one or more processors of a device, cause the device to perform the method of one or more of Aspects 26-38.

Aspect 67: An apparatus for wireless communication at a device, comprising a processor; memory coupled with the processor; and instructions stored in the memory and executable by the processor to cause the apparatus to perform the method of one or more of Aspects 39-46.

Aspect 68: A device for wireless communication, comprising a memory and one or more processors coupled to the memory, the one or more processors configured to perform the method of one or more of Aspects 39-46.

Aspect 69: An apparatus for wireless communication, comprising at least one means for performing the method of one or more of Aspects 39-46.

Aspect 70: A non-transitory computer-readable medium storing code for wireless communication, the code comprising instructions executable by a processor to perform the method of one or more of Aspects 39-46.

Aspect 71: A non-transitory computer-readable medium storing a set of instructions for wireless communication, the set of instructions comprising one or more instructions that, when executed by one or more processors of a device, cause the device to perform the method of one or more of Aspects 39-46.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      encode sidelink control information (SCI) associated with a communication on a sidelink channel, wherein the SCI includes second stage SCI (SCI-2), wherein the communication is associated with resource availability information for the sidelink channel, and wherein the SCI indicates that the communication is not intended for any legacy UE based at least in part on a destination identifier included in the SCI and associated with the communication; and
      transmit the SCI.

2. The apparatus of claim 1, wherein the communication includes at least one of a request for the resource availability information for the sidelink channel or a response including the resource availability information for the sidelink channel.

3. The apparatus of claim 1, wherein the destination identifier includes a specific identifier that is not associated with any legacy UE.

4. The apparatus of claim 1, wherein the SCI indicates that the communication is not intended for any legacy UE based at least in part on a message type field included in the SCI and associated with the communication.

5. The apparatus of claim 4, wherein the message type field comprises a bit field.

6. The apparatus of claim 1, wherein the SCI indicates that the communication is not intended for any legacy UE based at least in part on a format of the SCI.

7. The apparatus of claim 1, wherein the SCI includes a priority indicator that indicates a measure of priority for the communication.

8. The apparatus of claim 1, wherein the SCI is transmitted via physical sidelink shared channel (PSSCH).

9. An apparatus for wireless communication at a user equipment (UE), comprising:
   one or more memories; and
   one or more processors, coupled to the one or more memories, configured to:
      receive encoded sidelink control information (SCI) associated with a communication on a sidelink channel, wherein the SCI includes second stage SCI (SCI-2), wherein the communication is associated with resource availability information for the sidelink channel, and wherein the SCI indicates that the communication is not intended for any legacy UE based at least in part on a destination identifier included in the SCI and associated with the communication; and
      skip decoding of the communication.

10. The apparatus of claim 9, wherein the destination identifier includes a specific identifier that is not associated with any legacy UE.

11. The apparatus of claim 9, wherein the SCI indicates that the communication is not intended for any legacy UE based at least in part on a message type field included in the SCI and associated with the communication.

12. The apparatus of claim 11, wherein the message type field comprises a bit field.

13. The apparatus of claim 9, wherein the SCI indicates that the communication is not intended for any legacy UE based at least in part on a format of the SCI.

14. The apparatus of claim 9, wherein the SCI includes a priority indicator that indicates a measure of priority for the communication.

15. The apparatus of claim 9, wherein the SCI is received via physical sidelink shared channel (PSSCH).

16. A non-transitory computer-readable medium storing a set of instructions for wireless communication, the set of instructions comprising:
one or more instructions that, when executed by one or more processors of a user equipment (UE), cause the UE to:
encode sidelink control information (SCI) associated with a communication on a sidelink channel, wherein the SCI includes second stage SCI (SCI-2), wherein the communication is associated with resource availability information for the sidelink channel, and wherein the SCI indicates that the communication is not intended for any legacy UE based at least in part on a destination identifier included in the SCI and associated with the communication; and
transmit the SCI.

17. The non-transitory computer-readable medium of claim 16, wherein the communication includes at least one of a request for the resource availability information for the sidelink channel or a response including the resource availability information for the sidelink channel.

18. The non-transitory computer-readable medium of claim 16, wherein the destination identifier includes a specific identifier that is not associated with any legacy UE.

19. The non-transitory computer-readable medium of claim 16, wherein the SCI indicates that the communication is not intended for any legacy UE based at least in part on a message type field included in the SCI and associated with the communication.

20. The non-transitory computer-readable medium of claim 19, wherein the message type field comprises a bit field.

21. The non-transitory computer-readable medium of claim 16, wherein the SCI indicates that the communication is not intended for any legacy UE based at least in part on a format of the SCI.

22. The non-transitory computer-readable medium of claim 16, wherein the SCI includes a priority indicator that indicates a measure of priority for the communication.

23. A method of wireless communication performed by a user equipment (UE), comprising:
encoding sidelink control information (SCI) associated with a communication on a sidelink channel, wherein the SCI includes second stage SCI (SCI-2), wherein the communication is associated with resource availability information for the sidelink channel, and wherein the SCI indicates that the communication is not intended for any legacy UE based at least in part on a destination identifier included in the SCI and associated with the communication; and
transmitting the SCI.

24. The method of claim 23, wherein the communication includes at least one of a request for the resource availability information for the sidelink channel or a response including the resource availability information for the sidelink channel.

25. The method of claim 23, wherein the destination identifier includes a specific identifier that is not associated with any legacy UE.

26. The method of claim 23, wherein the SCI indicates that the communication is not intended for any legacy UE based at least in part on a message type field included in the SCI and associated with the communication.

27. The method of claim 26, wherein the message type field comprises a bit field.

28. The method of claim 23, wherein the SCI indicates that the communication is not intended for any legacy UE based at least in part on a format of the SCI.

29. The method of claim 23, wherein the SCI includes a priority indicator that indicates a measure of priority for the communication.

30. The method of claim 23, wherein the SCI is transmitted via physical sidelink shared channel (PSSCH).

* * * * *